United States Patent
Velusamy et al.

(10) Patent No.: US 10,275,115 B2
(45) Date of Patent: Apr. 30, 2019

(54) MULTIFUNCTION ICON FOR USER FEEDBACK INCLUDING CONTEXT INFORMATION

(71) Applicant: Verizon Patent and Licensing Inc., Arlington, VA (US)

(72) Inventors: Umashankar Velusamy, Tampa, FL (US); Benjamin Pomales, Tampa, FL (US); David M. Lopez, Tampa, FL (US); Timothy E. Richmond, Hernando, FL (US); Naveenkumar V, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 602 days.

(21) Appl. No.: 14/952,086

(22) Filed: Nov. 25, 2015

(65) Prior Publication Data

US 2017/0147186 A1 May 25, 2017

(51) Int. Cl.
*G06F 3/0482* (2013.01)
*G06F 3/0481* (2013.01)

(52) U.S. Cl.
CPC ........ *G06F 3/04817* (2013.01); *G06F 3/0482* (2013.01)

(58) Field of Classification Search
CPC .......................... G06F 3/04842; G06F 3/04817
See application file for complete search history.

(56) References Cited

U.S. PATENT DOCUMENTS

| | | | | | |
|---|---|---|---|---|---|
| 5,566,291 | A | * | 10/1996 | Boulton | G09B 5/065 434/118 |
| 7,516,438 | B1 | * | 4/2009 | Leonard | G06Q 10/10 706/13 |
| 8,739,047 | B1 | * | 5/2014 | Holler | G06F 3/04842 715/759 |
| 8,886,552 | B2 | * | 11/2014 | Finkelstein | G06Q 30/0203 705/7.29 |
| 2007/0130163 | A1 | * | 6/2007 | Perez | G06Q 10/10 |
| 2008/0201652 | A1 | * | 8/2008 | Ho | G06F 3/0482 715/765 |
| 2011/0161933 | A1 | * | 6/2011 | Hudson | G06F 11/0769 717/125 |
| 2012/0311538 | A1 | * | 12/2012 | Bhatia | G06F 11/3664 717/126 |
| 2013/0041958 | A1 | * | 2/2013 | Post | G06Q 10/107 709/206 |

(Continued)

*Primary Examiner* — Omar R Abdul-Ali

(57) ABSTRACT

A method includes transmitting first data causing a client device to display a webpage including a panel and an action access icon; transmitting second data to the client device causing, in response to a selection of the action access icon, the client device to display multiple action icons within or adjacent to the panel; receiving, from the client device, an indication that one of the multiple action icons was selected; obtaining a context identifier associated with the panel based on the indication; obtaining a user interface configured to allow submitting a developer work item for the context identifier; in response to the indication, transmitting third data to the client device causing the client device to display the user interface; receiving, via the user interface on the client device, the developer work item; and storing the developer work item in association with the context identifier.

17 Claims, 16 Drawing Sheets

(56) References Cited

U.S. PATENT DOCUMENTS

2013/0179799 A1* 7/2013 Savage ................ G06F 3/0482
715/751
2015/0180911 A1* 6/2015 Mavinakuli ......... H04L 41/0273
715/234

* cited by examiner

| SUBMITTED IDEA | VIEW ALL OF MY IDEAS | SUBMIT NEW IDEA |

User Information

First Name: Efrim
Last Name: Efram
Phone: 813-555-1212
Email: efrimblah@one.verizon.com
Request ID: 12345
Created by: efrimblah@one.verizon.com

Idea Information

Title for the Idea:
Ut imperdiet efficitur arcu

Idea Description:
Ut rhoncus, augue et ultrices condimentum, quam est dictum dui, a ultrices libero enim quis sapien.

Please Quantify the Productivity Impact:
Pellentesque suscipit diam non enim rutrum pretium. Donec tristique rutrum vulputate.

Please Outline the Benefits:
Curabitur tincidunt erat neque. In quam nunc, facilisis nec lobortis in, suscipit in lorem.

Existing Experience Rating: No, this is NEW!
Selected Panel: Task Summary Label A
Device Resolution: 768 x 1024

Attachments:
Attachment 1 | Attachment 2

Request Status : Testing Completed

Review — Accept — Development — Testing — Deployment

Screen Details (please annotate the existing panel)

VOTE

FIG. 10

1403 — Create Under-N Request (step 2 of 2)                                              X Follow the steps to complete the Under-N request for the selected panel and submit it:

| Select Capabilities | Provide Information |

User Information (1605)

| First Name: | Phone: | |
|---|---|---|
| User | 813-555-1212 | |
| Last Name: | Email: | Created by: |
| Smith | user.smith@one.verizon.com | user.smith@one.verizon.com |

Capability Selected

1610 — Selected:
Add a new field for display in meta-admin Screen                    1615

1611 — 
| Capability: | Panel: |
|---|---|
| GUI Changes (Engineering) | Express Resolution |

Check List for Requirements (Capture details for the requirements in notes)

1620
- ☐ BackCancelField Properties [ Possible Values, Validation ]
- ☐ Field Name
- ☐ Applicable Enterprise Data Standard
- ☐ Corresponding Field in the Source DB
- ☐ Meta Data Object Name
- ☐ Verification: Data Present in PC or existing interfaces 1625 — Screen Details (Please annotate the existing panel for the Under-N request) 📷

1630 — Notes

1635 — Attachment
[          ] [Browse...]

[Back] [Submit Request] [Cancel]
1400   1650    1640    1460

FIG. 16

| | 1711 | 1712 | | 1780 |
|---|---|---|---|---|
| 1404 | UNDER-N REQUEST | MY UNDER-N LIST | CREATE REQUEST | VOTE |

User Information

| First Name:<br>Efrim | Phone:<br>813-555-1212 | Request ID:<br>12345 |
|---|---|---|
| Last Name:<br>Efram | Email:<br>efrimblah@one.verizon.com | Created by:<br>efrimblah@one.verizon.com |

1720

Capability Selected

Selected:
Add a new manual task without conditional triggering

| Capability:<br>GUI Changes | Panel:<br>Express Resolution |
|---|---|

Attachments:
Attachment 1 | Attachment 2

1730

Request Status : Testing Completed

Development — Testing — Deployment

1740

Check List for Requirements (Capture details for the requirements in notes)

| ☑ BackCancelField Properties<br>  [ Possible Values, Validation ] | ☑ Field Name |
|---|---|
| ☑ Applicable Enterprise Data Standard | ☑ Corresponding Field in the Source DB |
| ☑ Meta Data Object Name | ☑ Verification: Data Present in PC<br>   or existing interfaces |

1750

Screen Details (please annotate the existing panel)

1760

Notes

Integer sit amet purus vitae erat dapibus fermentum eget sit amet nulla. Vivamus sodales

MULTIFUNCTION ICON FOR USER FEEDBACK INCLUDING CONTEXT INFORMATION

BACKGROUND

In making use of a website, users may encounter problems with the interfaces provided by the website, or users may identify desirable changes to existing interfaces or useful new interfaces. These situations generally lead to reports or requests being made to developers responsible for managing the interfaces provided by the website. From a developer perspective, the quality of reports or requests received from users are often of inconsistent quality and fail to adequately communicate what the user is requesting to be changed. From a user perspective, it is often difficult or inconvenient to efficiently and effectively deliver high quality reports or requests. Significant and substantial improvements can be made in the communication of these reports and requests from users to the relevant developers.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A illustrates a first panel and a second panel, both of which are included and concurrently displayed in a single webpage. FIG. 3B illustrates a first panel being displayed in an expanded mode.

FIG. 10 illustrates an example of a third view of the first user interface for viewing details about a submitted developer work item in the form of an idea or suggestion for improving the panel illustrated in FIG. 8.

FIG. 16 illustrates an example of a third view of the third user interface for a second step for submitting a new developer work item in the form of an "under-n" request for the panel illustrated in FIG. 14.

FIG. 17 illustrates an example of a fourth view of the third user interface for viewing details about a submitted developer work item in the form of an "under-n" request for the panel illustrated in FIG. 14.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
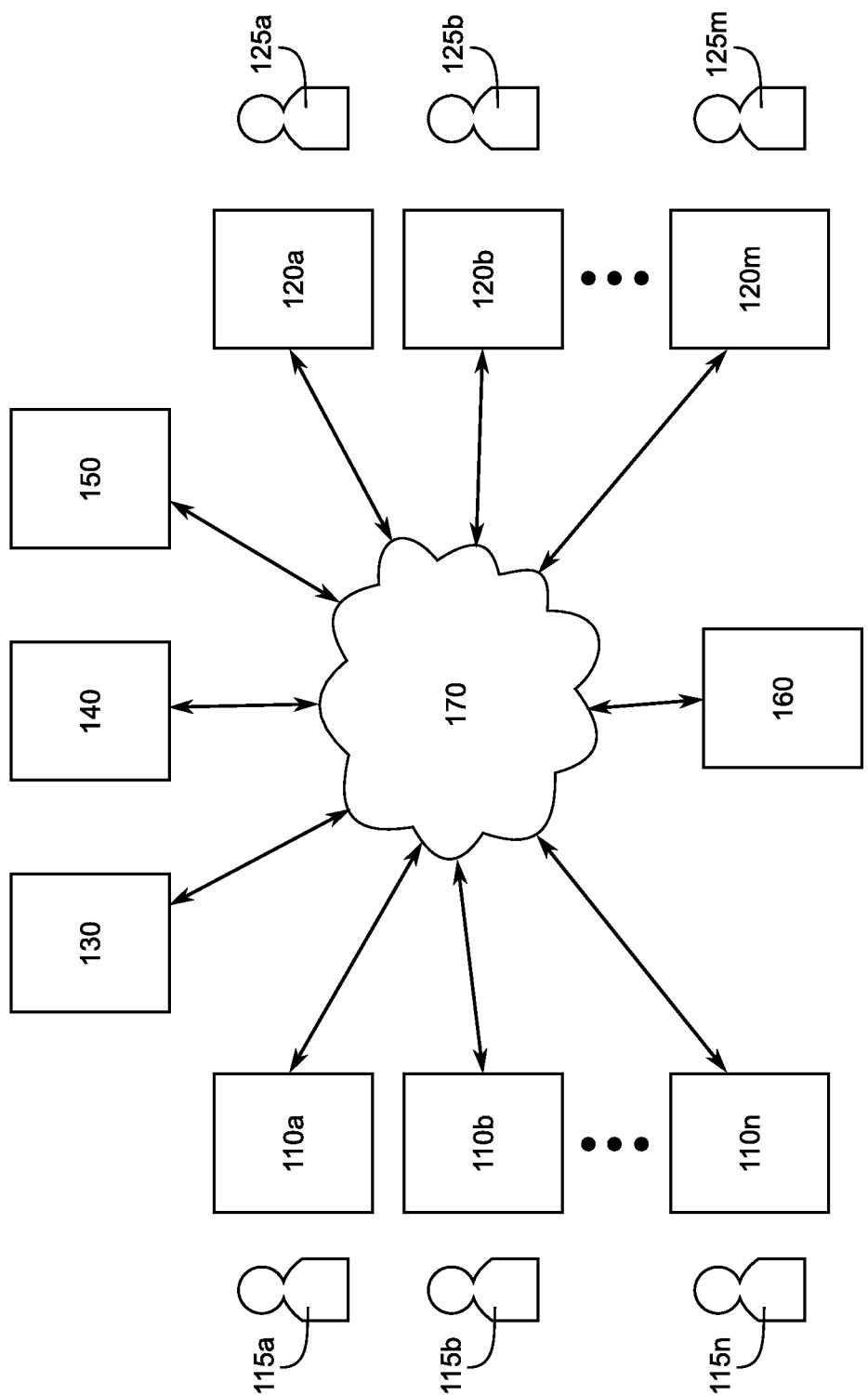
FIG. 1 illustrates an example schematic of various computer-based components discussed throughout this disclosure.

FIG. 1 illustrates an example schematic of various computer-based components discussed throughout this disclosure. The various computer-based components include client devices 110a-110n, for use by respective users 115a-115n. Client device 110a is configured to perform data communication via network 170. For example, client device 110 is configured to exchange data with web server 130. Client device 110a may include, for example, one or more processors configured to execute instructions; a display device, such as a monitor or a touch screen; one or more user input devices, such as a keyboard, mouse, or touchscreen; and a nontransitory memory which provides instructions for execution by the processors. Some of the instructions may be included as part of a web browser program executed by client device 110a. The web browser program may be configured to, for example, receive data from web server 130; process the received data to display webpages and update displayed webpages on the display device; receive and process user input obtained via the user input devices, such as text input via a keyboard or selection of webpage elements using a pointer device such as a mouse or touchscreen; and send data to webserver 130 in response to instructions included in webpages and/or obtained user input. Selection of webpage elements may include, for example, moving a pointer onto a webpage element and/or "clicking" on a webpage element indicated by the pointer. Each of client devices 110b-110n may be configured likewise. Examples of client devices 110a-110n include, but are not limited to a desktop computer, a notebook computer, a tablet computer device, and a smartphone. Other possible configurations for client devices 110a-110n are discussed in further detail below with respect to FIG. 18.

FIG. 1 also illustrates developer devices 120a-120m, for use by respective developers 125a-125n. Developer device 120a is configured to perform data communication via network 170. For example, developer device 120a may exchange data with web server 130, change/bug tracker 140, and/or email server 150. Developer device 120a may include, for example, one or more processors configured to execute instructions; a display device, such as a monitor or a touch screen; one or more user input devices, such as a keyboard, mouse, or touchscreen; and a nontransitory memory which provides instructions for execution by the processors. Some of the instructions may be included as part of programs executed by developer device 120a. Such programs may include, but are not limited to, a web browser effective for interacting with webpages generated by web server 130, change/bug tracker 140, and/or email server 150; an email client effective for sending and receiving emails with email server 150; and software development tools such as editors, source control programs, compilers, and/or debuggers for creating, revising, and/or testing software for execution by web server 130. Each of developer devices 120b-120m may be configured likewise. Examples of developer devices 120a-120m include, but are not limited to a desktop computer, a notebook computer, a tablet computer device, and a smartphone. Other possible configurations for developer devices 120a-120m are discussed in further detail below with respect to FIG. 18. In some cases, a developer device may function in the same manner as a client device in its interactions with web server 130; for example, developer work items may be generated via a developer device using the same interfaces as a client device.

FIG. 1 also illustrates web server 130. Web server 130 is configured to perform data communication via network 170. For example, web server 130 may execute application programs, which exchange data with client devices 110a-110n, developer devices 120a-120m, change/bug tracker 140, email server 150, and/or "under-n" database 160. For example, web server 130 may include one or more application programs configured to receive and respond to HTTP requests from client devices 110a-110n. Web server 130 may utilize one or more web application frameworks for generating webpages and webpage elements for transmission to systems such as client devices 110a-110n. Additionally, web server 130 may be configured to receive files produced by developers 125a-125m, which control the operation of the above programs and frameworks. Other possible configurations for web server 130 are discussed in further detail below with respect to FIG. 18.

FIG. 1 also illustrates change/bug tracker 140. The change/bug tracker 140 may be configured to store and retrieve information related to developer work items submitted via, for example, first user interface 800 illustrated in FIG. 9 and second user interface 1100 illustrated in FIG. 12. Change/bug tracker 140 may be implemented with a database, or with software application specifically directed to bug tracking activities.

FIG. 1 also illustrates email server 150. In some examples, email server 150 may not be included. In some examples, web server 130 may transmit emails to email server 150 to notify developers 125a-125m of new or updated developer work items. In some examples, email server 150 may provide emails to users 115a-115n to communicate status changes for developer work items, such as, but not limited to, acceptance or completion of developer work items.

FIG. 1 also illustrates "under-n" database 160, which may be configured to store and retrieve information related to developer work items submitted via, for example, third user interface 1400 illustrated in FIG. 16. In some examples, "under-n" database 160 may also be configured to track commitment of developers or developer resources to determine the availability of various "under-n" capabilities and/or schedules on which capabilities may be promised to be completed.

Although FIG. 1 illustrates the four components web server 130, change/bug tracker 140, email server 150, and "under-n" database 160, FIG. 1 merely illustrates one example configuration, and there are many other configurations effective for implementing the aspects and features discussed in this disclosure. For example, web server 130 may be configured to perform the functions of change/bug tracker 140, email server 150, and "under-n" database 160. In other examples, various aspects and features of this disclosure may be divided differently among multiple servers. In some examples, multiple servers may implement the same feature to provide capacity for additional users and/or backup servers in the event of hardware failures. In some examples, servers may be dynamically added or removed in response to variation in demand placed on the servers.

FIG. 1 also illustrates network 170. Network 170 provides communication facilities allowing the components illustrated in FIG. 1 to interact. In some examples, network 170 may include a cellular data network. In some examples, network 170 may include a local area network, which may include, for example, a wireless access point. In some examples, network 170 may include a wide area network, such as the Internet. Other details and aspects of network 170 are discussed with respect to FIG. 19.

Figure 2:
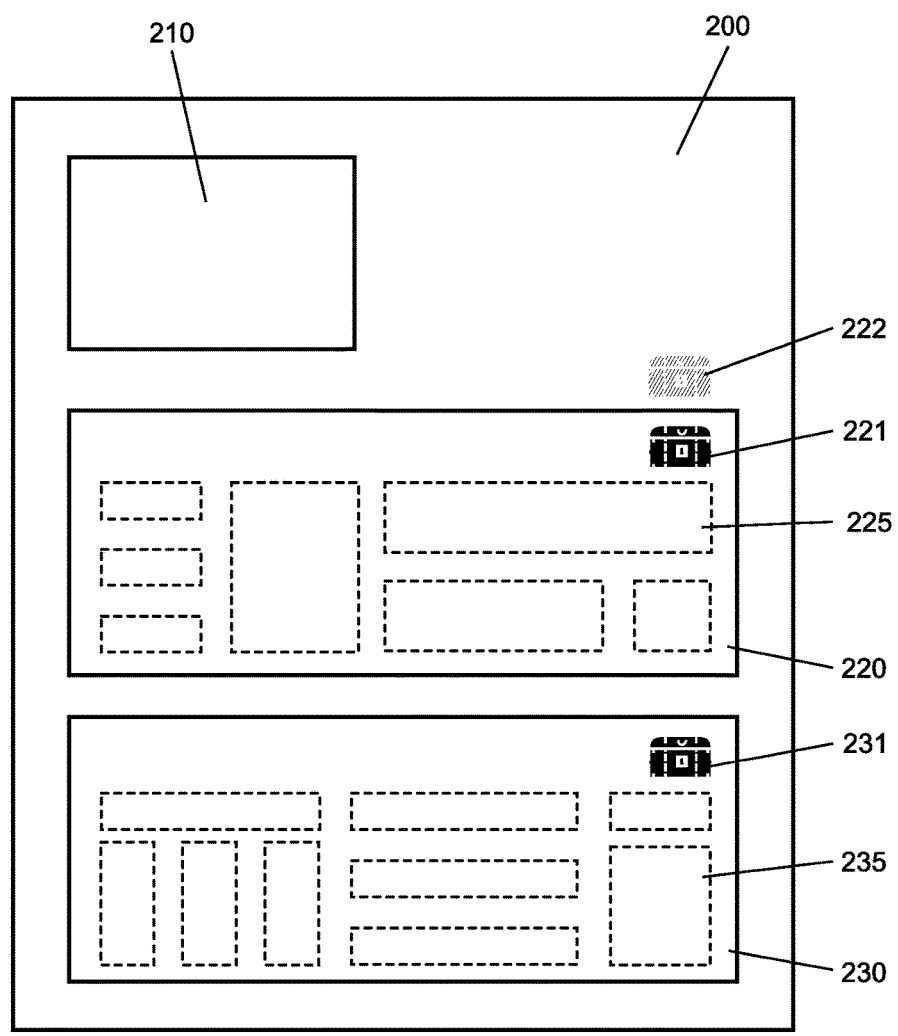
FIG. 2 illustrates an example of a webpage displayed by a client device in response to data received from a web server.

FIG. 2 illustrates an example of a webpage 200 displayed by a client device in response to data received from web server 130. For example, the client device may issue a request to web server 130 for webpage 200, and in response, web server 130 transmits data (such as, but not limited to HTML data) to the client device, which causes the client device to display webpage 200 on a display device of the client device. Webpage 200 includes and displays first element 210, first panel 220, and second panel 230. Webpage 200 further includes and displays action access icon 221 within first panel 220. In some examples, action access icon 221 may alternatively be displayed adjacent to first panel 220, such as at position 222. In some examples, first panel 220 might include a third panel (not illustrated) displayed within first panel 220, and the third panel may include its own respective action access icon.

Webpage 200 further includes and displays action access icon 231 within first panel 230. Use of action access icons 221 and 231 will be discussed in more detail below. First panel 220 and second panel 230 may include various user interface elements, such as user interface elements 225 and 235, examples of which may include, but are not limited to, pulldown selection items, text entry fields, radio buttons, checkboxes, file upload widgets, images, buttons, and hyperlinks. Web server 130 may be configured to obtain information from a database for populating the user interface elements included in first panel 220 with values or data stored in the database. First panel 220 may be configured to submit new or modified data entered into its user interface elements to web server 130, and in response to receiving this data, web server 130 may be configured to store the data in the database. Second panel 230 may be configured in much the same manner discussed above.

First panel 220 may be included in webpage 200 to display and/or receive related information about one or more entities. For example, first panel 220 may be configured to display and/or allow input of information about a customer, such as, but not limited to, the customer's first name, last name, street address, city, state, zip code, country, telephone number, account number, and date or birth. As other example, first panel 220 may be configured to display and/or allow input of information about a customer order, such as, but not limited to, a customer identifier, an identification of a product or service ordered by the customer, a date and/or schedule for fulfillment of the order, and a technician responsible for the order. Second panel 230 may be configured in much the same way.

Web server 130 transmits data to a client device which causes client device to display first panel 220. There are many possible implementations by which this data may be generated by web server 130. For example, the data for first panel 220 may be generated based on templates, descriptions, and/or code, which may be used to determine types, size, positioning, orientation, and layout of user interface elements included in first panel 220. Web server 130 may identify one or more databases and/or other servers for storing and retrieving information for first panel 220, and be configured to access such databases and/or servers according to their respective communication protocols and schema. The data may also be generated based on the webpage in which first panel 220 is to be included. Web server 130 may be configured to generate and transmit data for second panel 230 in much the same manner.

A plurality of context identifiers may each be associated with one or more panels provided by web server 130. For example, a first context identifier may be associated with a customer information panel for accessing specific fields in a customer information database, and displaying the fields with a specific layout of user interface elements. In some examples, a context identifier may be used in a webpage specification file to indicate that a panel associated with the context identifier is to be included in a webpage. In some examples, some or all of the content identifiers may be used to identify webpage 200 in which first panel 220 is displayed. In some examples, a context identifier may be used to identify one or more developers responsible for maintaining a panel. The context identifiers may be in any form useful for processing by a computer, including, but not limited to, an alphanumeric string, a numeric value, a filename, a UUID, or a URI (uniform resource indicator). In some examples, a short text label may be associated with a context identifier; for example, a panel used for displaying and receiving customer information might have an associated context identifier of "ae2f758a-16c1-44f3-b02b-f6920a551b0f" (a version 4 UUID) with an associated text label of "Customer Information." The text label (or the context identifier itself) may be displayed in various user interface elements to identify a context, such as, but not limited to, panel labels 313, 323, 815, 1115, and 1415, panel indicator 1205, and the "Selected Panel" portions of FIGS. 10, 13, and 17.

Figure 3A:
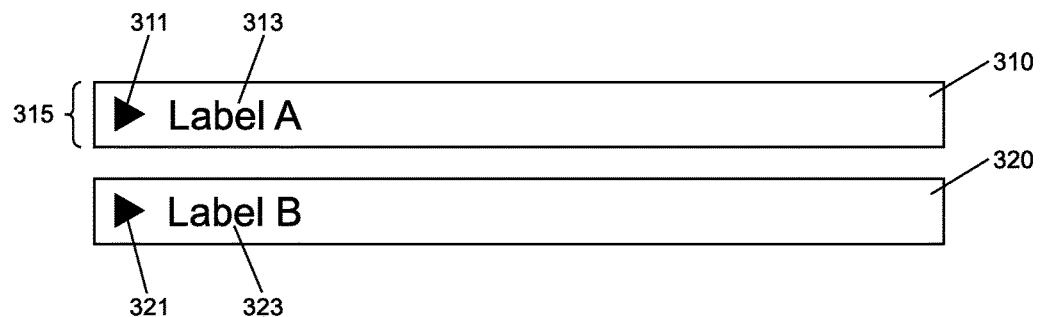
FIGS. 3A and 3B illustrate examples of panels included in a webpage displayed by a client device.
Figure 3B:
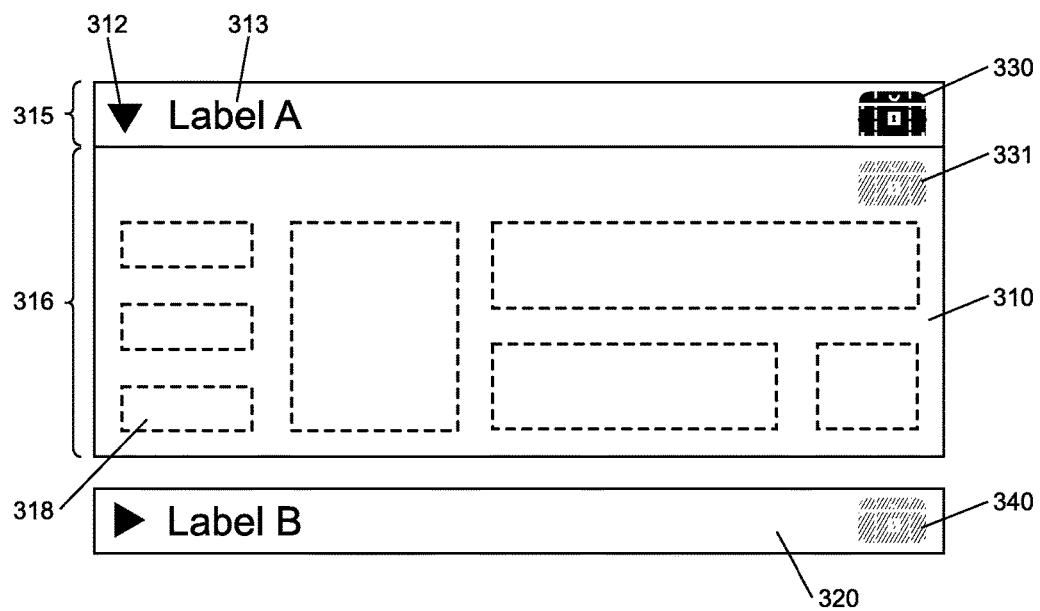

FIGS. 3A and 3B illustrate examples of panels included in a webpage displayed by a client device. FIG. 3A illustrates first panel 310 and second panel 320, both of which are included and concurrently displayed in a single webpage. As illustrated in FIG. 3A, first panel 310 is displayed in a collapsed mode, in which only a top title portion 315 is visible. In its collapsed mode, a mode setting element 311 (illustrated in this example as a sideways-pointing arrow) and a panel label 313 are visible within first panel 310. Panel label 313 may provide a brief text description of the panel. Likewise, FIG. 3A also illustrates second panel 320 in a collapsed mode. In its collapsed mode, mode setting element 321 and panel label 323 are visible within second panel 320. By selecting mode setting element 311, such as by clicking on mode setting element 311, display of first panel 310 may be switched to an expanded mode, as illustrated in FIG. 3B. In some examples, display of first panel 310 may be switched to its expanded mode by selecting panel label 312 or top title portion 315. In some examples, mode setting element 311 may not be included in panel 310. Second panel 320 may be configured and operate much the same as first panel 310.

FIG. 3B illustrates first panel 310 being displayed in an expanded mode. Much as discussed above, in response to selecting mode setting element 311, panel label 313, or top title portion 315 illustrated in FIG. 3A, a client device may transition to displaying first panel 310 in an expanded mode as illustrated in FIG. 3B. Additionally, in response to selecting mode setting element 312, panel label 313, or top title portion 315 of the expanded first panel 310 illustrated in FIG. 3B, the client device may transition to displaying first panel 310 in a collapsed mode as illustrated in FIG. 3A. When initially displayed in a webpage, first panel 310 may be displayed in either a collapsed mode or an expanded mode. In the expanded mode illustrated in FIG. 3B, a main portion 316 of first panel 310 is displayed. Main portion 316 may include various user interface elements, such as user interface element 318, much as discussed with respect to user interface elements 225 and 235 illustrated in FIG. 2. Web server 130 may be configured to defer transmitting data for main portion 316 until first panel 310 is displayed in its expanded mode, which may be effective in reducing data bandwidth and/or database access resource requirements.

Action access icon 330, which is not displayed in the collapsed panels 310 and 320 illustrated in FIG. 3A, may be displayed in top title portion 315 when first panel 310 is displayed in its expanded mode. Alternatively, action access icon 330 may be displayed in main portion 316, such as at position 331. Alternatively, action access icon 330 may be displayed adjacent to, but outside of, first panel 310. Second panel 320 may be configured and operate much the same as first panel 310. In some examples, an action access icon may be displayed in a panel when it is in a collapsed mode, such as at position 340 illustrated in FIG. 3B.

Figure 4:
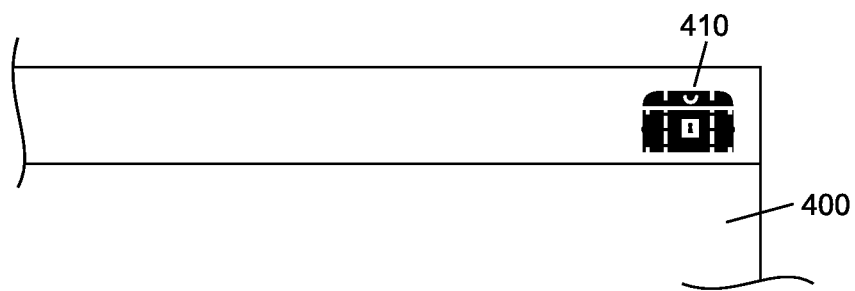
FIGS. 4-7 illustrate various examples of how action icons may be displayed in response to selection of an action access icon.

FIGS. 4-7 illustrate various examples of how action icons 420, 430, and 440 may be displayed in response to selection of an action access icon 410. FIG. 4 illustrates an example in which an action access icon 410 is displayed within a panel 400, much as action access icons 221 and 231 are illustrated in FIG. 2 and action access icon 330 is illustrated in FIG. 3B. In the particular examples illustrated in FIGS. 4, 5, and 7, action icon 410 is an image of a treasure box, with FIG. 4 displaying a closed box, and FIGS. 5 and 7 displaying an open box. Web server 130 transmits data to a client device which causes, in response to a selection of action access icon 410, the client device to display action icons 420, 430, and 440 within or adjacent to panel 400. Selection of action access icon 410 may be performed by, for example, placing a pointer over action access icon 410 or clicking on action access icon 410 with a mouse or other pointing device.

Figure 5:
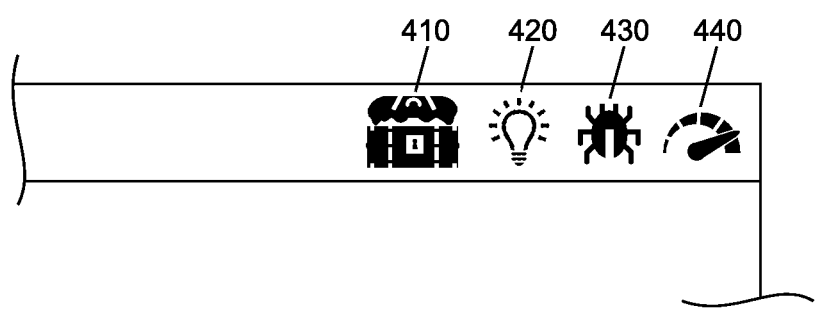
Figure 6:
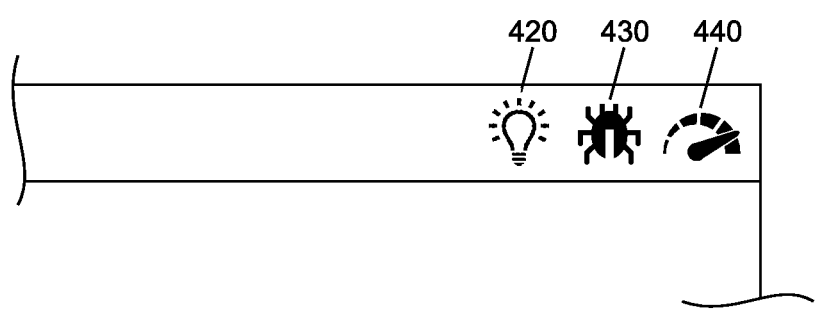
Figure 7:
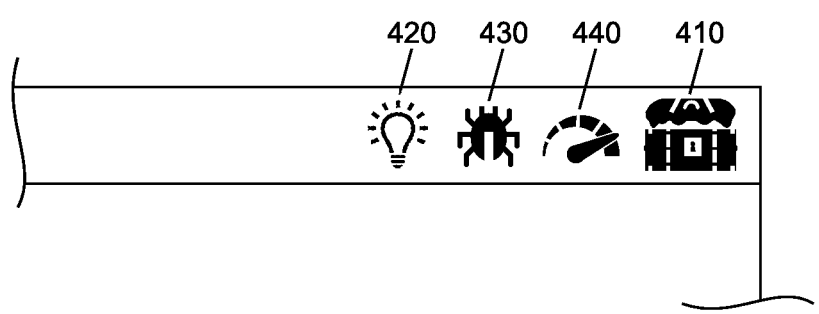

FIG. 5 illustrates an example in which, in response to a selection of action access icon 410, action access icon 410 is moved leftward, and action icons 420, 430, and 440 are displayed to the right of action access icon 410. FIG. 6 illustrates an example in which, in response to a selection of action access icon 410, action access icon 410 is not displayed, and action icons 420, 430, and 440 are displayed in place of action access icon 410. FIG. 7 illustrates an example in which, in response to a selection of action access icon 410, action access icon 410 remains in its original position, and action icons 420, 430, and 440 are displayed to the side of action access icon 410. In some examples, a selection of action access icon 410 in FIGS. 5 and 7 may cause action icons 420, 430, and 440 to not be displayed, much as illustrated in FIG. 4. FIGS. 4-7 merely illustrate example implementations for displaying action icons 420, 430, and 440 in response to selection of action access icon 410. In some examples, only two action icons may be displayed. In some examples, four or more action icons may be displayed.

Action icons 420, 430, and 440 may include images indicative of their associated actions. In the examples illustrated in FIGS. 5-7, a first action icon 420 includes an image of a light bulb, indicating its use for submitting an idea or suggestion for improving panel 400. In the examples illustrated in FIGS. 5-7, a second action icon 430 includes an image of an insect, indicating its use for submitting a bug report for panel 400. In the examples illustrated in FIGS. 5-7, a third action icon 440 includes an image of a speedometer, indicating its use for submitting a change to be made to panel 400 within a specified period of time. It may be possible that third action icon 440 (or any other action icons) may be selectively displayed in response to a determination that its respective action can be supported for the panel it is displayed in. For example, if there are no supported changes for panel 400 that can be performed in a specified amount of time, then the third action icon 440 may not be displayed when the action access icon 410 is selected.

Figure 8:
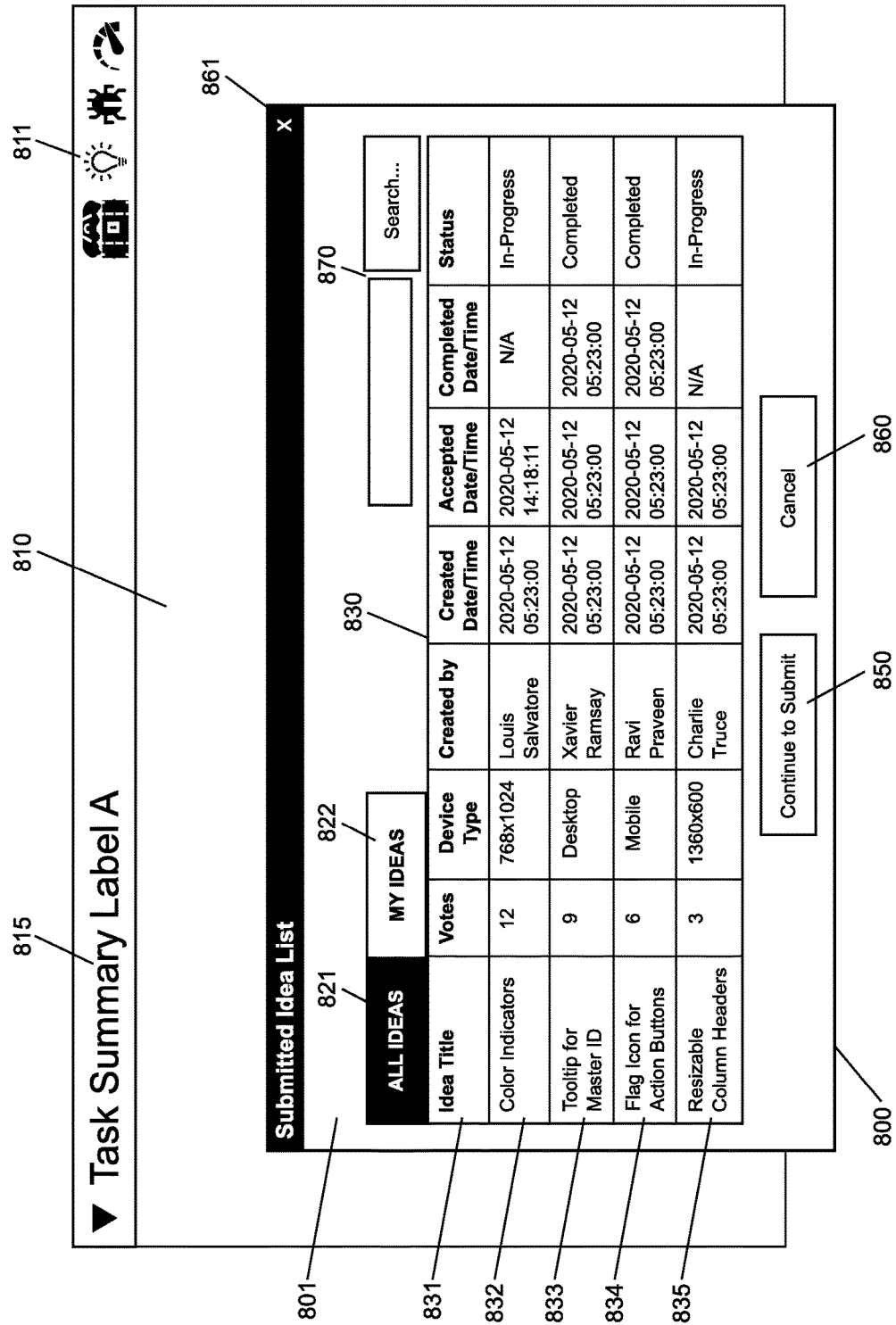
FIG. 8 illustrates an example of a first view of a first user interface associated with developer work items in the form of ideas or suggestions for improving a panel.

FIG. 8 illustrates an example of a first view 801 of a first user interface 800 associated with developer work items in the form of ideas or suggestions for improving panel 810. Panel 810 includes panel label 815. The first user interface 800 is displayed in response to a selection of first action icon 811 associated with panel 810, and may initially display first view 801. As illustrated in FIG. 8, first view 801 may be concurrently displayed with panel 810 in a single webpage display window. First user interface 800 may also be displayed in a different display window than a display window for displaying the webpage including panel 810. First view 801 is configured to allow review of developer work items for ideas or suggestions previously submitted in association with a context identifier associated with panel 810. Web server 130 may be configured to obtain information about such developer work items from, for example, change/bug tracker 140 or a database, and use the obtained information to generate data sent to a client device for display in in first user interface 800. By facilitating review of previously submitted developer work items, first view 801 reduces the likelihood of a user submitting a duplicate idea or suggestion, and allows a user to identify developer work items for which the user may wish to supply additional information and/or comments.

In the example illustrated in FIG. 8, two tabs 821 and 822 are included in first view 801. The first tab 821, which is illustrated as currently active in FIG. 8, allows review of developer work items for ideas or suggestions previously submitted by all users in association with a context identifier associated with panel 810. In the example illustrated in FIG. 8, information about four such developer work items is displayed in a table 830 in respective item rows 832-835 below title row 831, which displays titles for the columns of table 830. The information displayed for each developer work item may include, for example, a short title for the developer work item; a total number of votes received indicating interest in the developer work item being completed; a device type associated with the developer work item, such as a desktop computer, a mobile computing device such as a smart phone, or an indication of a screen resolution for a device; which user submitted the developer work item; a time and date that the developer work item was initially submitted; a time and date that a developer indicated acceptance of the developer work item; a time and date that a developer indicated completion of the developer work item; and a status of the developer work item, such as in-progress or completed.

The second tab 822 allows review of ideas or suggestions previously submitted by a specific user, the specific user having been identified as using the client device on which first view 801 is displayed, in association with the context identifier associated with panel 810. There are many techniques by which user may be identified; for example, the user having previously supplied a username and/or password to web server 130. Any such developer work items may be presented in much the same manner as discussed above with respect to first tab 821.

First view 801 may be configured such that in response to a selection of one of item rows 832-835, the first user interface 800 displays third view 803 (illustrated in FIG. 10) to allow review of the developer work item associated with the selected row in greater detail. First view 801 also includes view change button 850, selection of which causes first user interface 800 to display second view 802 (illustrated in FIG. 9). First view 801 also may include cancel button 860 and/or cancel icon 861, selection of which causes the client device to stop displaying the first user interface 800. First view 801 may also include search tool 870, allowing for text-based or more advanced searching and/or filtering of submitted developer work items.

Figure 9:
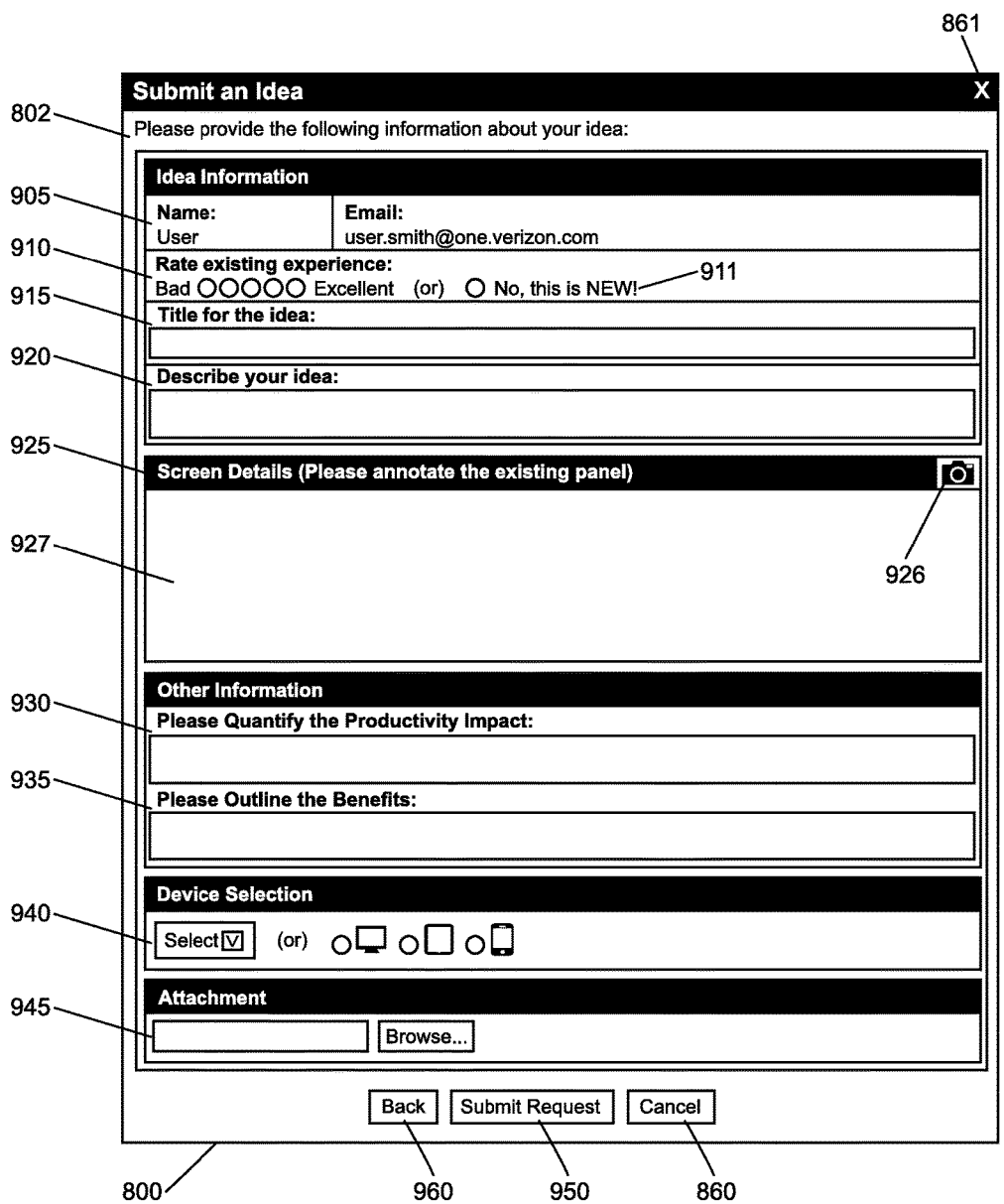
FIG. 9 illustrates an example of a second view of the first user interface for submitting a new developer work item in the form of an idea or suggestion for improving the panel illustrated in in FIG. 8.

FIG. 9 illustrates an example of a second view 802 of the first user interface 800 for submitting a new developer work item in the form of an idea or suggestion for improving panel 810. As discussed above, the first user interface 800 is displayed in response to a selection of first action icon 811 associated with panel 810. The first user interface 800 may initially display second view 802. Although panel 810 is not illustrated in FIG. 9, much as illustrated in FIG. 8, second view 802 may be concurrently displayed with panel 810 in a single webpage display window.

Second view 802 may include user identification portion 905. User identification portion 905 may be automatically populated if a specific user has been identified as using the client device on which second view 802 is displayed. User identification portion 905 may include user interface elements that allow for entry, selection, and/or modification of the user's name and/or email address. User identification portion 905 may include other user information, such as, for example, a telephone number (see, for example, user identification portion 1605 in FIG. 16). Information submitted via user identification portion 905 may be displayed in the "Created by" column illustrated in FIG. 8. In some cases, second view 802 may not display a user identification portion 905, but web server 130 may be configured to obtain an identification of a user of second view 802 and record the user in association with a developer work item submitted via second view 802. Second view 802 may include experience rating portion 910, in which a user may indicate a subjective rating of the quality of the user experience for the current implementation of panel 810. Experience rating portion 910 may include new feature indicator 911 which, in some cases, may be used to indicate that an idea or suggestion relates to a new feature for panel. In some cases, selection of new feature indicator 911 may indicate that a user suggests adding a new panel, in which case the associated developer work item may not be associated with a context identifier for panel 810.

Second view 802 may include title entry portion 915 that includes a text entry field for entering a brief description for the developer work item. A brief description submitted via title entry portion 915 may be displayed in the "Idea Title" column illustrated in FIG. 8. Second view 802 may include detailed description entry portion 920, which may include a text entry field.

Second view 802 may include screenshot image portion 925, which may be used to capture and/or annotate a screenshot image of panel 810. Screenshot image portion 925 may include screenshot capture element 926, illustrated as a camera icon in FIG. 9, which, when selected, may cause a client device to capture a screenshot image of panel 810. Screenshot image portion 925 may include display/annotation portion 927, which may display a screenshot image, and may provide user interface elements that allow editing and/or annotation of the screenshot image.

Second view 802 may include productivity impact entry portion 930, which may include a text entry field for specifying an anticipated improvement and/or degree of improvement in user productivity that may be realized by implementation of the idea or suggestion. Second view 802 may include benefit entry portion 935, which may include a text entry field for specifying an anticipated benefit of implementing the idea or suggestion. Second view 802 may include device indication portion 940 which includes one or more user interface elements for indicating a client device's device type (such as, but not limited to, a desktop computer, a tablet computer, and a mobile smartphone computer) and/or screen resolution. This may be used, for example, in a situation where a user comes up with an idea or suggestion for a panel on one type of device, but is submitting the idea or suggestion via another device for the same panel. Information submitted via device indication portion 940 may be displayed in the "Device Type" column illustrated in FIG. 8. In some cases, a client device or web server 130 may be able to automatically determine or guess the user's device type or resolution and automatically configure the user interface elements included in device indication portion 940 accordingly. Second view 802 may include attachment uploading portion 945, via which a user may specify and/or provide one or more files to be transmitted to web server 130 and associated with a developer work item as attached files.

Second view 802 includes submit button 950, selection of which results in the client device transmitting information and/or data provided via second view 802 to web server 130 as a new developer work item for an idea or suggestion for panel 810 and/or a context identifier associated with panel 810. In response to receiving the new developer work item via second view 802 of first user interface 800, web server 130 may store the received new developer work item in association with the context identifier associated with panel 810. For example, web server 130 may interact with change/bug tracker 140 to store the new developer work item therein.

Second view 802 may include view change button 960, selection of which causes first user interface 800 to display first view 801 (illustrated in FIG. 8), and possibly discard any information entered into second view 802. Second view 802 also may include cancel button 860 and/or cancel icon 861, selection of which causes the client device to stop displaying the first user interface 800.

FIG. 10 illustrates an example of a third view 803 of the first user interface 800 for viewing details about a submitted developer work item in the form of an idea or suggestion for improving panel 810. As discussed above, the first user interface 800 is displayed in response to a selection of first action icon 811 associated with panel 810. The first user interface 800 may initially display third view 803. Although panel 810 is not illustrated in FIG. 10, much as illustrated in FIG. 8, third view 803 may be concurrently displayed with panel 810 in a single webpage display window.

Third view 803 may include first view change button 1011, selection of which causes first user interface 800 to display first view 801 (illustrated in FIG. 8). Third view 803 may include second view change button 1012, selection of which causes first user interface 800 to display second view 802 (illustrated in FIG. 9). Third view 803 may include voting button 1020 allowing a user to submit a vote indicating interest in the developer work item being displayed in third view 803 being completed. Selection of voting button 1020 causes a client device to transmit a vote for the developer work item to web server 130. In response to receiving the vote, web server 130 may increment and store a total number of votes received for the developer work item being displayed in third view 803. Third view 803 may include a withdraw button (not illustrated), which allows the user to withdraw a developer work item previously requested by the user.

Third view 803 displays details about a submitted developer work item for panel 810. Third view 803 may include a user information portion 1030, a developer work item information portion 1040, a status portion 1050, and/or screen details portion 1060. Information displayed in portions 1030, 1040, and 1060 corresponds to information provided via second view 802. In some examples, third view 803 may allow a user to edit some or all of this information. In some examples, an additional portion may be displayed to a developer that allows the entry and review of notes relating to the displayed developer work item. Status portion 1050 provides a user with an indication as to how the developer work item has been handled by developers 125a-125m. In the specific example illustrated in FIG. 10, development and testing have been completed, but the developer work item has not yet been deployed.

Figure 11:
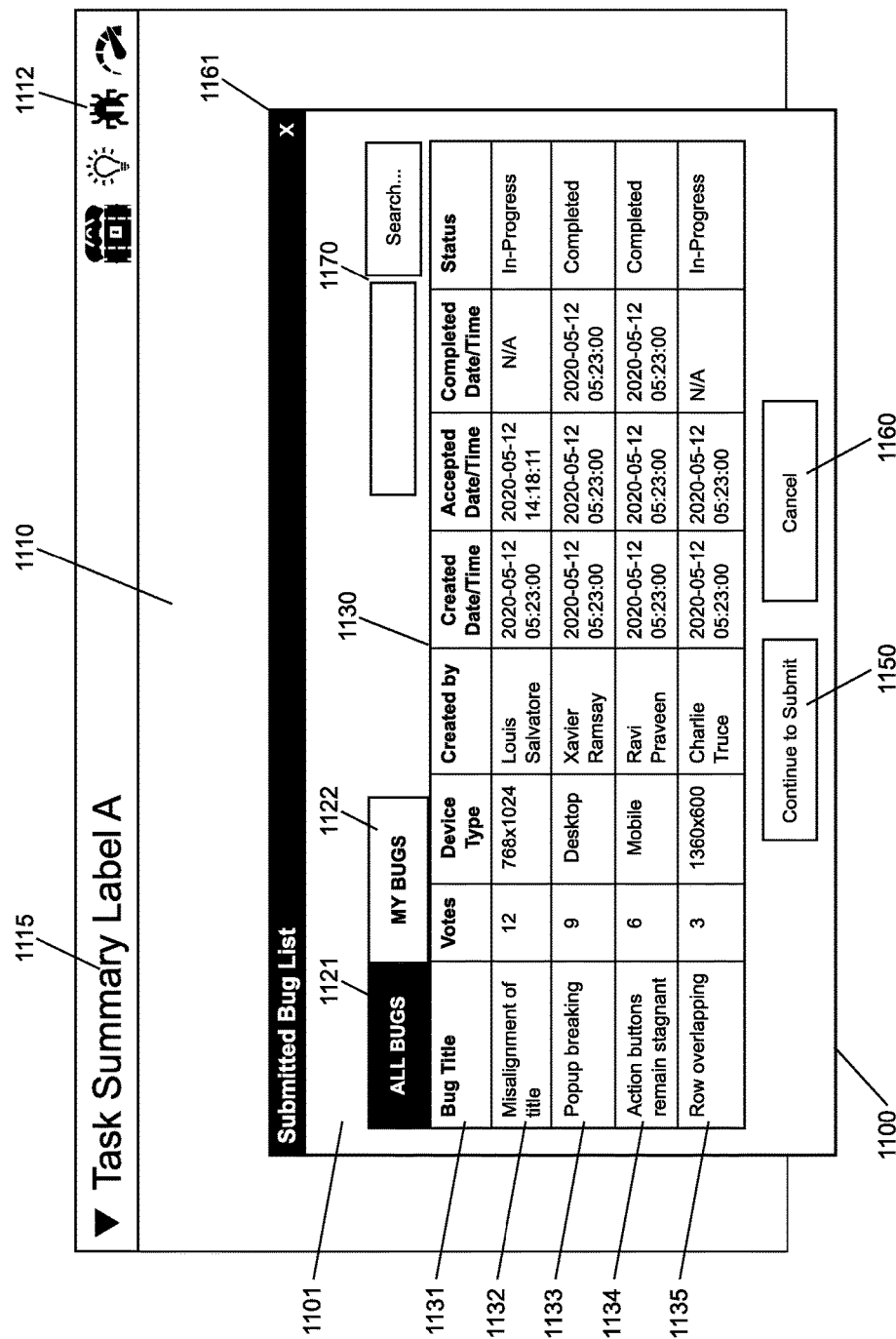
FIG. 11 illustrates an example of a first view of a second user interface associated with developer work items in the form of bug reports for a panel.

FIG. 11 illustrates an example of a first view 1101 of a second user interface 1100 associated with developer work items in the form of bug reports for panel 1110. Such bug reports may be used by users of client devices 110a-110n to report incorrect and/or undesired operation or other problems with panel 1110. Panel 1110 includes panel label 1115. The second user interface 1100 is displayed in response to a selection of second action icon 1112 associated with panel 1110, and may initially display first view 1101. As illustrated in FIG. 11, first view 1101 may be concurrently displayed with panel 1110 in a single webpage display window. Second user interface 1100 may also be displayed in another display window separate from the webpage including panel 1110. First view 1101 is configured to allow review of developer work items for bug reports previously submitted in association with a context identifier associated with panel 1110. Web server 130 may be configured to obtain information about such developer work items from, for example, change/bug tracker 140 or a database, and use the obtained information to generate data sent to a client device for display in in second user interface 1100. By facilitating review of previously submitted developer work items, first view 1101 reduces the likelihood of a user submitting a duplicate bug report, and allows a user to identify developer work items for which the user may wish to supply additional information and/or comments.

In the example illustrated in FIG. 11, two tabs 1121 and 1122 are included in first view 1101. The first tab 1121, which is illustrated as currently active in FIG. 11, allows review of developer work items for bug reports previously submitted by all users in association with a context identifier associated with panel 1110. In the example illustrated in FIG. 11, information about four such developer work items is displayed in a table 1130 in respective item rows 1132-1135 below title row 1131, which displays titles for the columns of table 1130. The information displayed for each developer work item may include, for example, a short title for the developer work item; a total number of votes received indicating interest in the developer work item being completed; a device type associated with the developer work item, such as a desktop computer, a mobile computing device such as a smart phone, or an indication of a screen resolution for a device; which user submitted the developer work item; a time and date that the developer work item was initially submitted; a time and date that a developer indicated acceptance of the developer work item; a time and date that a developer indicated completion of the developer work item; and a status of the developer work item, such as in-progress or completed.

The second tab 1122 allows review of bug reports submitted by a specific user, the specific user having been identified as using the client device on which first view 1101 is displayed, in association with the context identifier associated with panel 1110. There are many techniques by which user may be identified; for example, the user having previously supplied a username and/or password to web server 130. Any such developer work items may be presented in much the same manner as discussed above with respect to first tab 1121.

First view 1101 may be configured such that in response to a selection of one of item rows 1132-1135, the second user interface 1100 displays third view 1103 (illustrated in FIG. 13) to allow review of the developer work item associated with the selected row in greater detail. First view 1101 also includes view change button 1150, selection of which causes second user interface 1100 to display second view 1102 (illustrated in FIG. 12). First view 1101 may also include cancel button 1160 and/or cancel icon 1161, selection of which causes the client device to stop displaying the second user interface 1100. First view 1101 may also include search tool 1170, allowing for text-based or more advanced searching and/or filtering of submitted developer work items.

Figure 12:
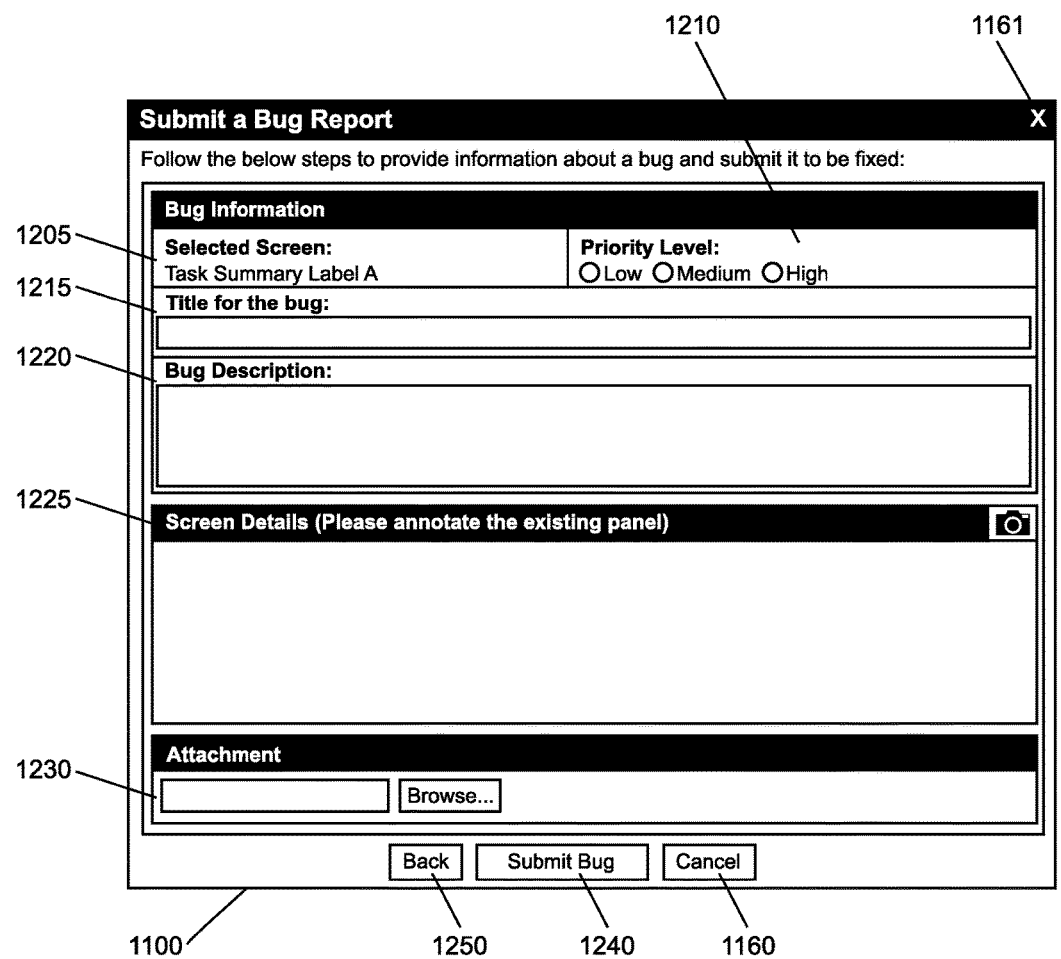
FIG. 12 illustrates an example of a second view of the second user interface for submitting a new developer work item in the form of a bug report for the panel illustrated in FIG. 11.

FIG. 12 illustrates an example of a second view 1102 of the second user interface 1100 for submitting a new developer work item in the form of a bug report for panel 810. As discussed above, the second user interface 1100 is displayed in response to a selection of second action icon 1112 associated with panel 1110. The second user interface 1100 may initially display second view 1102. Although panel 1110 is not illustrated in FIG. 12, much as illustrated in FIG. 11, second view 1102 may be concurrently displayed with panel 1110 in a single webpage display window.

Second view 1102 may include panel indicator 1205, identifying panel 1110. Text displayed in panel indicator 1205 may be, for example, the text displayed in panel label 1115, or a short text label associated with a context identifier associated with panel 1110. Second view 1102 may include priority entry portion 1210, allowing a user to specify a priority for resolution of the reported bug. Second view 1102 may include title entry portion 1215 that includes a text entry field for entering a brief description for the developer work item. A brief description submitted via title entry portion 1215 may be displayed in the "Bug Title" column illustrated in FIG. 11. Second view 1102 may include detailed description entry portion 1220, which may include a text entry field.

Second view 1102 may include screenshot image portion 1225, which may be used to capture and/or annotate a screenshot image of panel 1110. Screenshot image portion 1225 operates in much the same manner described with respect to screenshot image portion 925. Second view 1102 may include attachment uploading portion 1230, via which a user may specify and/or provide one or more files to be transmitted to web server 130 and associated with a developer work item as attached files.

Second view 1102 includes submit button 1240, selection of which results in the client device transmitting information and/or data provided via second view 1102 to web server 130 as a new developer work item for a bug report for panel 1110 and/or a context identifier associated with panel 1110. In response to receiving the new developer work item via second view 1102 of first user interface 1100, web server 130 may store the received new developer work item in association with the context identifier associated with panel 1110. For example, web server 130 may interact with change/bug tracker 140 to store the new developer work item therein.

Second view 1102 may include view change button 1250, selection of which causes second user interface 1100 to display first view 1101 (illustrated in FIG. 11), and possibly discard any information entered into second view 1102. Second view 1102 also may include cancel button 1160 and/or cancel icon 1161, selection of which causes the client device to stop displaying the second user interface 1100.

In some cases, second view 1102 may include a user identification portion, much like user identification portion 905. In some cases, web server 130 may be configured to obtain an identification of a user of second view 1102 and record the user in association with a developer work item submitted via second view 1202. A user identification obtained by web server 130 may be displayed in the "Created by" column illustrated in FIG. 11. In some cases, second view 1102 may include a device indication portion, much like device indication portion 940. In some cases, a client device or web server 130 may be configured to automatically determine or guess a user's device type or resolution and include this information with a bug report stored by web server 130. A device identification obtained by web server 130 may be displayed in the "Device Type" column illustrated in FIG. 11.

Figure 13:
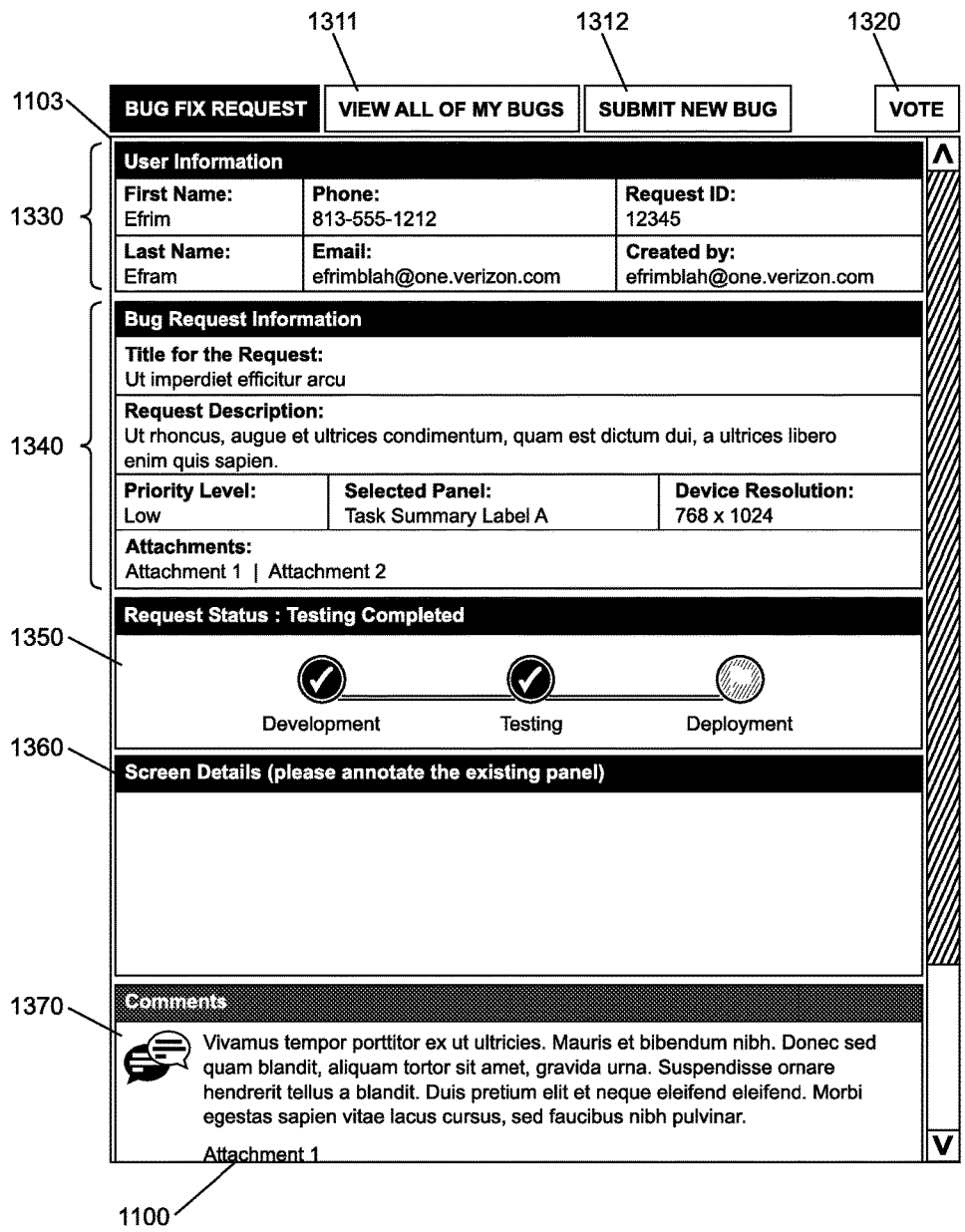
FIG. 13 illustrates an example of a third view of the second user interface for viewing details about a submitted developer work item in the form of a bug report for the panel illustrated in FIG. 11.

FIG. 13 illustrates an example of a third view 1103 of the second user interface 1100 for viewing details about a submitted developer work item in the form of a bug report for panel 810. As discussed above, the second user interface 1100 is displayed in response to a selection of second action icon 1112 associated with panel 1110. The second user interface 1100 may initially display third view 1103. Although panel 1110 is not illustrated in FIG. 13, much as illustrated in FIG. 11, third view 1103 may be concurrently displayed with panel 1110 in a single webpage display window.

Third view 1103 may include first view change button 1311, selection of which causes second user interface 1100 to display first view 1101 (illustrated in FIG. 11). Third view 1103 may include second view change button 1112, selection of which causes second user interface 1100 to display second view 1102 (illustrated in FIG. 12). Third view 1103 may include voting button 1120 allowing a user to submit a vote indicating interest in the developer work item being displayed in third view 103 being completed. Selection of voting button 1320 causes a client device to transmit a vote for the developer work item to web server 130. In response to receiving the vote, web server 130 may increment and store a total number of votes received for the developer work item being displayed in third view 1103. Third view 1103 may include a withdraw button (not illustrated), which allows the user to withdraw a bug report previously submitted by the user.

Third view 1103 displays details about a submitted developer work item for panel 1110. Third view 1103 may include a user information portion 1330, a developer work item information portion 1340, a status portion 1350, and/or screen details portion 1360. Information displayed in portions 1330, 1340, and 1360 corresponds to information provided via second view 1102. In some examples, third view 1103 may allow a user to edit some or all of this information. In some examples, an additional portion may be displayed to a developer that allows the entry and review of developer notes relating to the displayed developer work item. Status portion 1350 provides a user with an indication as to how the developer work item has been handled by developers 125a-125m. In the specific example illustrated in FIG. 13, development and testing have been completed, but the developer work item has not yet been deployed. Third view 1103 may also include comments portion 1370, via which comments about the displayed developer work item can be reviewed, added, and/or edited.

Figure 14:
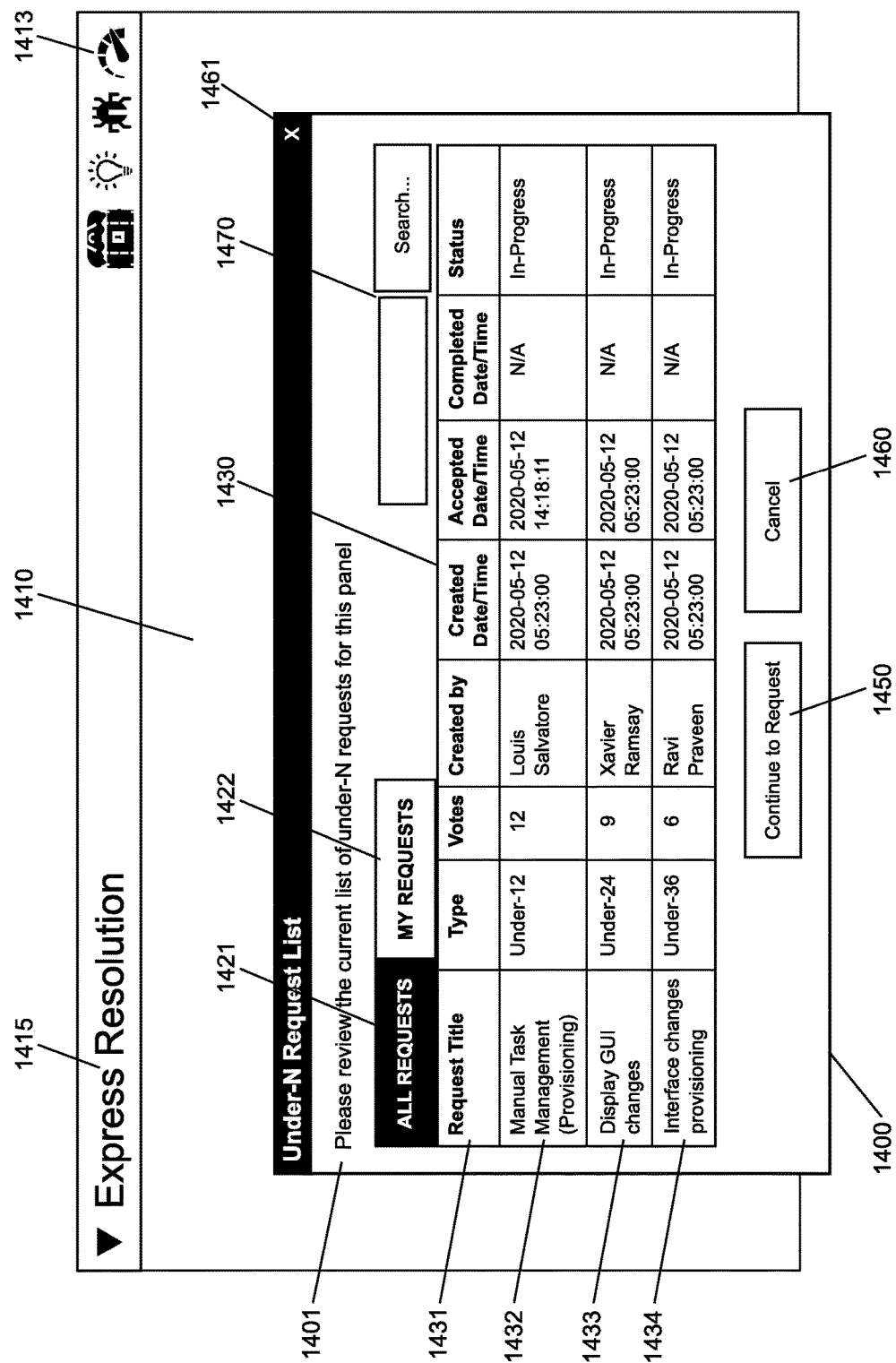
FIG. 14 illustrates an example of a first view of a third user interface associated with developer work items in the form of changes to be made to a panel within a specified period of time, referred to in FIGS. 14-17 as "under-n" requests.
Figure 15:
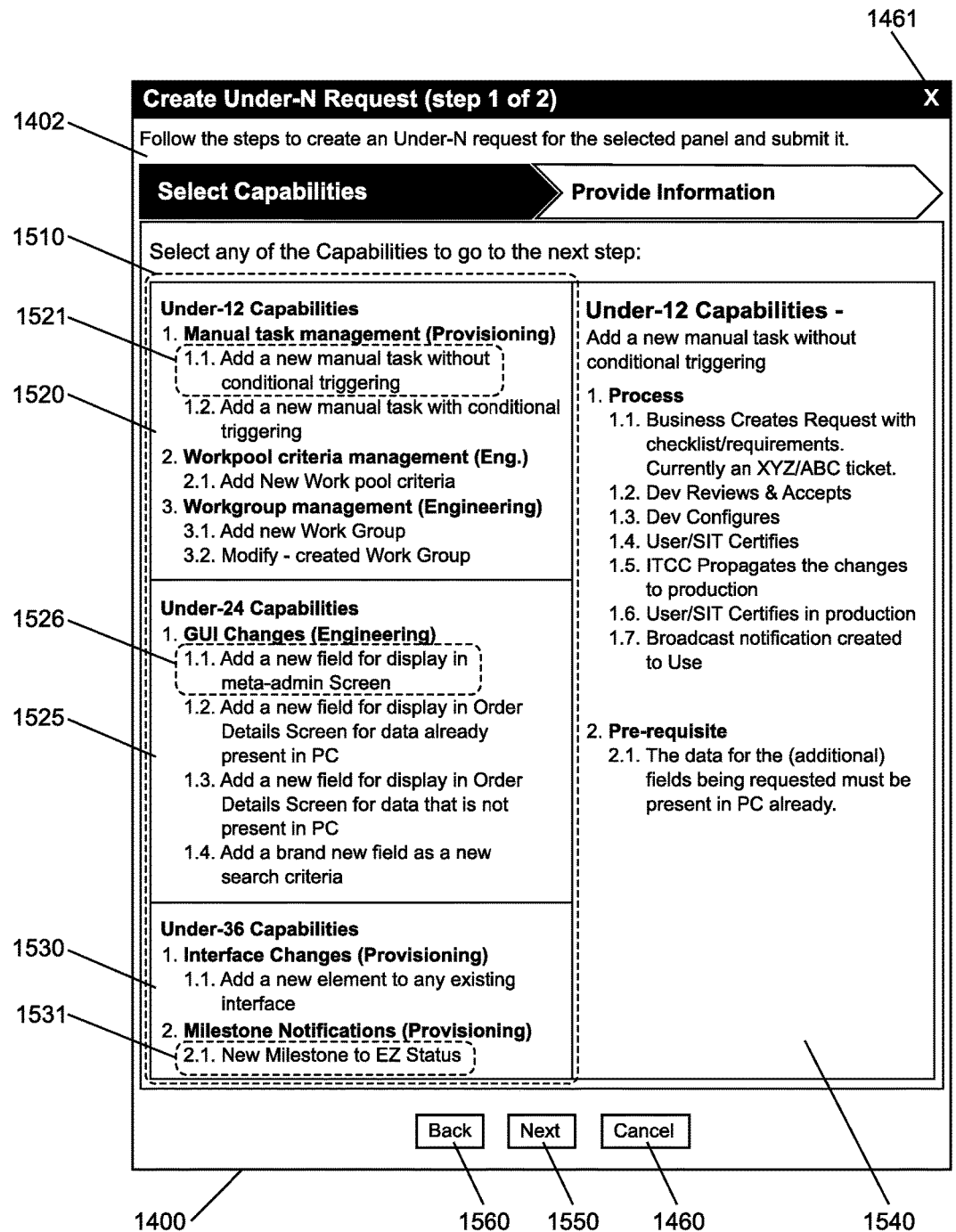
FIG. 15 illustrates an example of a second view of the third user interface for a first step for submitting a new developer work item in the form of an "under-n" request for the panel illustrated in FIG. 14.

FIG. 14 illustrates an example of a first view 1401 of a third user interface 1400 associated with developer work items in the form of changes to be made to panel 1410 within a specified period of time, referred to in FIGS. 14-17 as "under-n" requests. The "n" in the term "under-n," as illustrated in FIGS. 14-17, refers to a number of hours within which the requested change will be completed. For example, an "under-12" request will be completed within 12 hours, an "under-24" request will be completed within 24 hours, and an "under-36" request will be completed within 36 hours. The "n" might instead be used to refer to a different unit of time or resource measurement, such as, but not limited to, a number of days. As illustrated in FIG. 15, a development or support team may in advance categorize specific change capabilities as being "under-12," under-24", "under-36," or such.

The third user interface 1400 is displayed in response to a selection of third action icon 1413 associated with panel 1410, and may initially display first view 1401. As illustrated in FIG. 14, first view 1401 may be concurrently displayed with panel 1410 in a single webpage display window. Third user interface 1400 may also be displayed in a different display window than a display window for displaying the webpage including panel 1410. First view 1401 is configured to allow review of developer work items for "under-n" requests previously submitted in association with a context identifier associated with panel 1410. Web server 130 may be configured to obtain information about such developer work items from, for example, "under-n" database 160 or another database, and use the obtained information to generate data sent to a client device for display in in third user interface 1400. By facilitating review of previously submitted developer work items, first view 1401 reduces the likelihood of a user submitting a duplicate "under-n" request, and allows a user to identify developer work items for which the user may wish to supply additional information and/or comments.

In the example illustrated in FIG. 14, two tabs 1421 and 1422 are included in first view 1401. The first tab 1421, which is illustrated as currently active in FIG. 14, allows review of developer work items for "under-n" requests previously submitted by all users in association with a context identifier associated with panel 1410. In the example illustrated in FIG. 14, information about three such developer work items is displayed in a table 1430 in respective item rows 1432-1434 below title row 1431, which displays titles for the columns of table 1430. The information displayed for each developer work item may include, for example, a short title for the developer work item; a total number of votes received indicating interest in the developer work item being completed; a time and date that the developer work item was initially submitted; a time and date that a developer indicated acceptance of the developer work item; a time and date that a developer indicated completion of the developer work item; and a status of the developer work item, such as in-progress or completed. In some examples, table 1430 may not display completed developer work items, or first view 1401 may include a user interface element for enabling and/or disabling the display of completed developer work items.

The second tab 1422 allows review of "under-n" requests previously submitted by a specific user, the specific user having been identified as using the client device on which first view 1401 is displayed, in association with the context identifier associated with panel 1410. There are many techniques by which user may be identified; for example, the user having previously supplied a username and/or password to web server 130. Any such developer work items may be presented in much the same manner as discussed above with respect to first tab 1421.

First view 1401 may be configured such that in response to a selection of one of item rows 1432-1434, the third user interface 1400 displays fourth view 1404 (illustrated in FIG. 17) to allow review of the developer work item associated with the selected row in greater detail. First view 1401 also includes view change button 1450, selection of which causes third user interface 1400 to display second view 1402 (illustrated in FIG. 15). First view 1401 also may include cancel button 1460 and/or cancel icon 1461, selection of which causes the client device to stop displaying the third user interface 1400. First view 1401 may also include search tool 1470, allowing for text-based or more advanced searching and/or filtering of submitted developer work items.

FIG. 15 illustrates an example of a second view 1402 of the third user interface 1400 for a first step for submitting a new developer work item in the form of an "under-n" request for panel 1410. As discussed above, the third user interface 1400 is displayed in response to a selection of third action icon 1413 associated with panel 1410. The third user interface 1400 may initially display second view 1402. Although panel 1410 is not illustrated in FIG. 15, much as illustrated in FIG. 14, second view 1402 may be concurrently displayed with panel 1410 in a single webpage display window.

Second view 1402 includes capabilities list 1510, listing a plurality of change capabilities for making changes to panel 1410. In the example illustrated in FIG. 15, change capabilities listed in capabilities list 1510 are divided into three change categories 1520, 1525, and 1530. First change category 1520 consists of "under-12" change capabilities (labeled 1.1, 1.2, 2.1, 3.1, and 3.2), which are changes that will be completed within 12 hours of being submitted. Second change category 1525 consists of "under-24" change capabilities (labeled 1.1, 1.2, 1.3, and 1.4), which are changes that will be completed within 24 hours of being submitted. Third change category 1530 consists of "under-36" change capabilities (labeled 1.1 and 2.1), which are changes that will be completed within 36 hours of being submitted. In general, change capabilities listed in capabilities list 1410 are common, well-defined development tasks that typically can be performed by developers 125a-125m in a predictable period of time. In some examples, the inclusion of a particular change capability in capabilities list 1510, or which change category a particular change capability is placed in may be updated to reflect expected short-term development capacity. For example, if developer resources required for change capability 1531 are insufficient over the next 36 hours, change capability 1531 may be temporarily omitted from capabilities list 1510. As another example, if developer resources required for change capability 1521 are insufficient over the next 12 hours, change capability 1521 may be temporarily moved into second change category 1525.

An individual change capability, such as change capabilities 1521, 1526, and 1531, may be selected from capabilities list 1510. In response to the selection of a change capability, detail display portion 1540 displays details about the selected change capability. For example, FIG. 15 illustrates an example in which change capability 1521 has been selected.

Second view 1402 includes next step button 1550, selection of which causes second user interface 1400 to display third view 1403 (illustrated in FIG. 16) for entering details for a selected change capability. Second view 1402 may also include view change button 1560, selection of which causes second user interface 1400 to display first view 1401 (illustrated in FIG. 14). Second view 1402 also may include cancel button 1460 and/or cancel icon 1461, selection of which causes the client device to stop displaying the second user interface 1400.

FIG. 16 illustrates an example of a third view 1403 of the third user interface 1400 for a second step for submitting a new developer work item in the form of an "under-n" request for panel 1410. As discussed above, the third user interface 1400 is displayed in response to a selection of third action icon 1413 associated with panel 1410. Although panel 1410 is not illustrated in FIG. 16, much as illustrated in FIG. 14, third view 1403 may be concurrently displayed with panel 1410 in a single webpage display window. FIG. 16 illustrates an example in which change capability 1526 was selected via second view 1402.

Third view 1403 may include user identification portion 1605. User identification portion 1605 may be automatically populated if a specific user has been identified as using the client device on which third view 1403 is displayed. User identification portion 1605 may include user interface elements that allow for entry, selection, and/or modification of the user's name, telephone number, and/or email address. Information submitted via user identification portion 1605 may be displayed in the "Created by" column illustrated in FIG. 14. In some cases, third view 1403 may not display a user identification portion 1605, but web server 130 may be configured to obtain an identification of a third of second view 1403 and record the user in association with a developer work item submitted via third view 1403.

Third view 1403 may include capability display fields 1610 and 1611, each including text based on the change capability selected via second view 1402. Third view 1403 may include panel indicator 1615, identifying panel 1410. Text displayed in panel indicator 1615 may be, for example, the text displayed in panel label 1415, or a short text label associated with a context identifier associated with panel 1410. Third view 1403 may include checklist 1620, to help confirm that all expected requirements for the selected change capability are being provided. In some examples, third view 1403 may not allow submission of the developer work item until each item in checklist 1620 has been checked off.

Third view 1403 may include screenshot image portion 1625, which may be used to capture and/or annotate a screenshot image of panel 1410. Screenshot image portion 1625 operates in much the same manner described with respect to screenshot image portion 925. Third view 1403 may include note entry portion 1630 which may include a text entry field for providing notes about the developer work item, such as details relating to the items in checklist 1620. Third view 1403 may include attachment uploading portion 1635, via which a user may specify and/or provide one or more files to be transmitted to web server 130 and associated with a developer work item as attached files.

Third view 1403 includes submit button 1640, selection of which results in the client device transmitting information and/or data provided via second view 1402 and third view 1403 to web server 130 as a new developer work item for a change to be made to panel 1410 and/or a context identifier associated with panel 1410 within a specified period of time. In response to receiving the new developer work item via third view 1403 of second user interface 1400, web server 130 may store the received new developer work item in association with the context identifier associated with panel 1410. For example, web server 130 may interact with "under-n" database 160 to store the new developer work item therein.

Third view 1403 may include view change button 1650, selection of which causes second user interface 1400 to display second view 1402 (illustrated in FIG. 15), and possibly discard any information entered into third view 1403. Third view 1403 also may include cancel button 1460 and/or cancel icon 1461, selection of which causes the client device to stop displaying the first user interface 1400.

FIG. 17 illustrates an example of a fourth view 1404 of the third user interface 1400 for viewing details about a submitted developer work item in the form of an "under-n" request for panel 810. As discussed above, the third user interface 1400 is displayed in response to a selection of third action icon 1413 associated with panel 1410. The third user interface 1400 may initially display fourth view 1404. Although panel 1410 is not illustrated in FIG. 17, much as illustrated in FIG. 14, fourth view 1404 may be concurrently displayed with panel 1410 in a single webpage display window.

Fourth view 1404 may include first view change button 1711, selection of which causes third user interface 1400 to display first view 1401 (illustrated in FIG. 14). Fourth view 1404 may include second view change button 1712, selection of which causes third user interface 1400 to display second view 1402 (illustrated in FIG. 15). Fourth view 1404 may include a withdraw button (not illustrated), which allows the user to withdraw a developer work item previously requested by the user.

Fourth view 1404 displays details about a submitted developer work item for panel 1410. Fourth view 1404 may include a user information portion 1720, a developer work item information portion 1730, a status portion 1740, checklist portion 1750, screen details portion 1760, and/or notes portion 1770. Information displayed in portions 1720, 1730, 1750, 1760, and 1770 corresponds to information provided via second view 1402 and third view 1403. In some examples, fourth view 1404 may allow a user to edit some or all of this information. In some examples, an additional portion may be displayed to a developer that allows the entry and review of developer notes relating to the displayed developer work item. Status portion 1740 provides a user with an indication as to how the developer work item has been handled by developers 125a-125m. In the specific example illustrated in FIG. 17, development and testing have been completed, but the developer work item has not yet been deployed.

Figure 18:
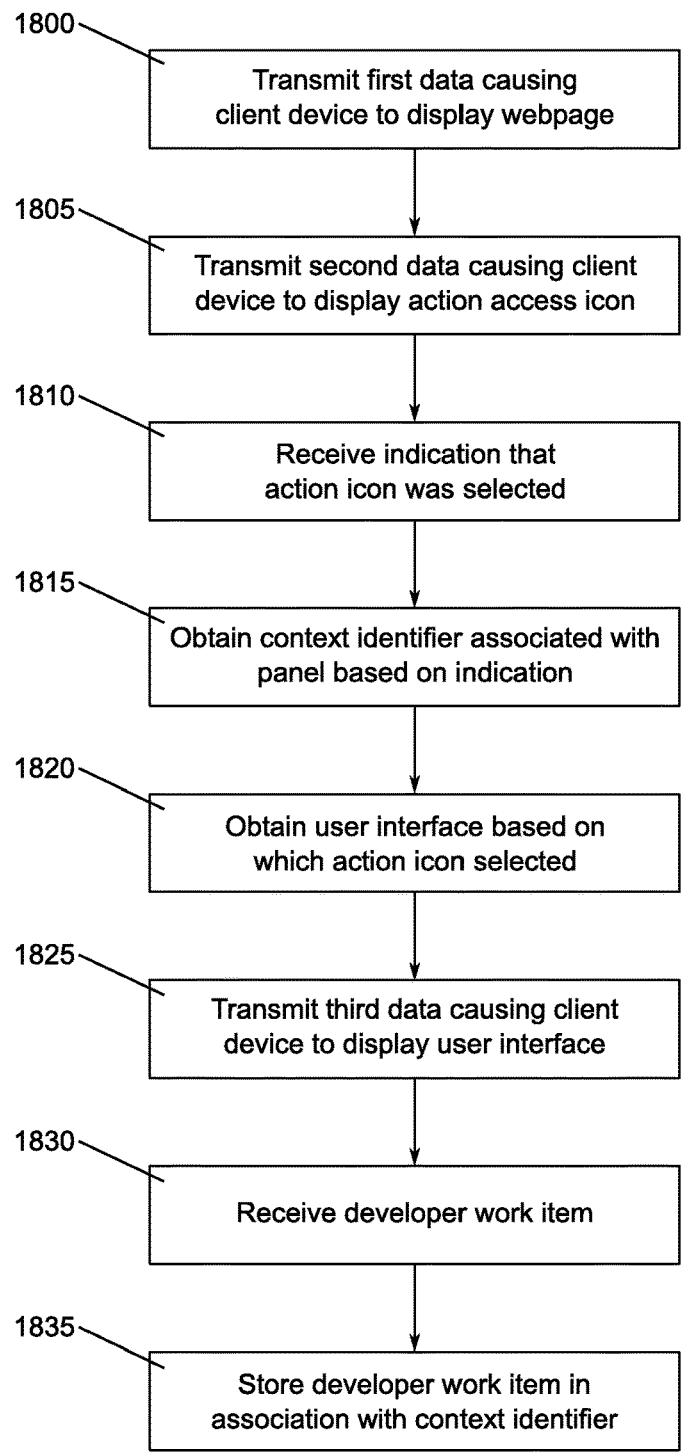
FIG. 18 illustrates examples of methods for submitting and processing developer work items

FIG. 18 illustrates examples of methods for submitting and processing developer work items. The above discussion of FIGS. 1-17 is relevant to these methods. Although the discussion of FIG. 18 is presented in terms of various actions performed by web server 130, in some implementations the described actions may be performed by a system one or more processors each configured to execute instructions, and one or more nontransitory storage mediums configured to provide stored instructions to the one or more processors which cause the one or more processors to perform the described actions.

At 1800, web server 130 transmits first data to a client device which causes the client device to display a webpage, the webpage including a first panel and a first action access icon displayed within or adjacent to the first panel. In some examples, the client device executes a web browser application program which receives and processes the first data, and in response renders the webpage on a display device included in the client device. FIGS. 2, 3A, 3B, 4, 5, 7, 8, 11, and 14 illustrate various examples of the webpage, the first panel, and the first action access icon. First data may be transmitted to the client device in a single file or data stream, or may be transmitted in multiple portions. As illustrated in FIGS. 3A and 3B, the first panel may initially be displayed without the first action access icon, with first action access icon later displayed within or adjacent to the first panel in response to a selection of a portion of the first panel.

At 1805, web server 130 transmits second data to the client device which causes, in response to a selection of the first action access icon, the client device to display a plurality of action icons within or adjacent to the first panel. In some implementations, the second data may be transmitted along with the first data in a single file or data stream describing the webpage. FIGS. 5-8, 11, and 14 illustrate various examples of the plurality of action icons, in which the plurality of action icons includes a first action icon associated with developer work items in the form of ideas or suggestions for improving the first panel, a second action icon associated with developer work items in the form of bug reports for the first panel, and a third action icon associated with developer work items in the form of changes to be made to panel 1410 within a specified period of time, referred to in FIGS. 14-17 as "under-n" requests.

At 1810, web server 130 receives, from the client device, a first indication that one of the plurality of action icons adjacent to the first panel was selected. In some implementations, the first indication may be in the form of a request from client device for a first user interface from a plurality of user interfaces.

At 1815, web server 130 obtains a first context identifier associated with the first panel based on the first indication. In some examples, the client device may expressly indicate the first context identifier to web server 130. In some examples, web server 130 may determine the first context identifier from other information received from the client device, such as the first indication received at 1810.

At 1820, web server 130 obtains the first user interface from the plurality of user interfaces, based on which one of the plurality of action icons the first indication indicates was selected, wherein the first user interface is configured to allow submitting a first developer work item for the first context. In some examples, the first indication may expressly identify first user interface from among the plurality of user interfaces. In some examples, web server 130 may identify and/or generate the first user interface based on the first indication and/or the first context identifier. FIGS. 8-17 illustrate various examples of the first user interface and the plurality of user interfaces, in which the user interfaces may display various views, including views for submitting developer work items and views for reviewing submitted developer work items.

In some examples, such as the examples illustrated in FIGS. 8, 10, 11, 13, 14, and 17, the first user interface may also be configured to allow reviewing developer work items previously submitted in association with the first context identifier, which may involve retrieving first information about a second developer work item previously submitted in association with the first context identifier and transmitting data to the client device which causes the client device to display the first information in the first user interface. In some such examples, the first information may include a completion status for the second developer work item, and the transmitted data may cause the client device to display the completion status in the first user interface, as illustrated by the "Status" columns illustrated in FIGS. 8, 11, and 14, and status portions 1050, 1350, and 1740 illustrated in FIGS. 10, 13, and 17.

In some examples, the first user interface is configured to allow submitting a vote indicating interest in the second developer work item being completed, such as via voting buttons 1020, 1320, and 1780 illustrated in FIGS. 10, 13, and 17, which may involve receiving the vote via the first user interface on the client device, and in response to receiving the vote, storing a total number of votes received for the second developer work item.

At 1825, in response to the first indication, web server 130 transmits third data to the client device which causes the client device to display the first user interface. FIGS. 8-17 illustrate various examples of displaying the first user interface. In some examples, the third data may cause the client device to capture a screenshot image of the first panel in response to a selection of a screenshot capture element of the first user interface, such as via screenshot capture element 926 included in screenshot image portion 925 illustrated in FIG. 9, and similar screenshot image portions 1225 and 1625 illustrated in FIGS. 12 and 16, and the first developer work item received by web server 130 may include the screenshot image or an image based on the captured screenshot image, such as a screenshot image annotated or edited via screenshot image portions 925, 1225, and 1625.

At 1830, web server 130 receives, via the first user interface on the client device, the first developer work item. The discussion of FIGS. 9, 12, and 15 discusses examples in which selection of submit buttons 950, 1240, and 1640 results in information about new developer work items provided via respective user interfaces being transmitted to web server 130.

At 1835, web server stores the first developer work item in association with the first context identifier. In some examples, web server 130 interacts with change/bug tracker 140 and/or "under-n" database 160 to store the first developer work item.

In some examples, after the first developer work item has been received, web server 130 may identify a first developer from among developers 125a-125m based on the first context identifier, and notify the first developer that the first developer work item was received. Such notification may be performed by, but is not limited to, an email delivered to the first developer via email server 150.

In some examples, the webpage may include both the first panel and a second panel, each with respective action access icons, as illustrated in FIGS. 2 and 3B.

Figure 19:
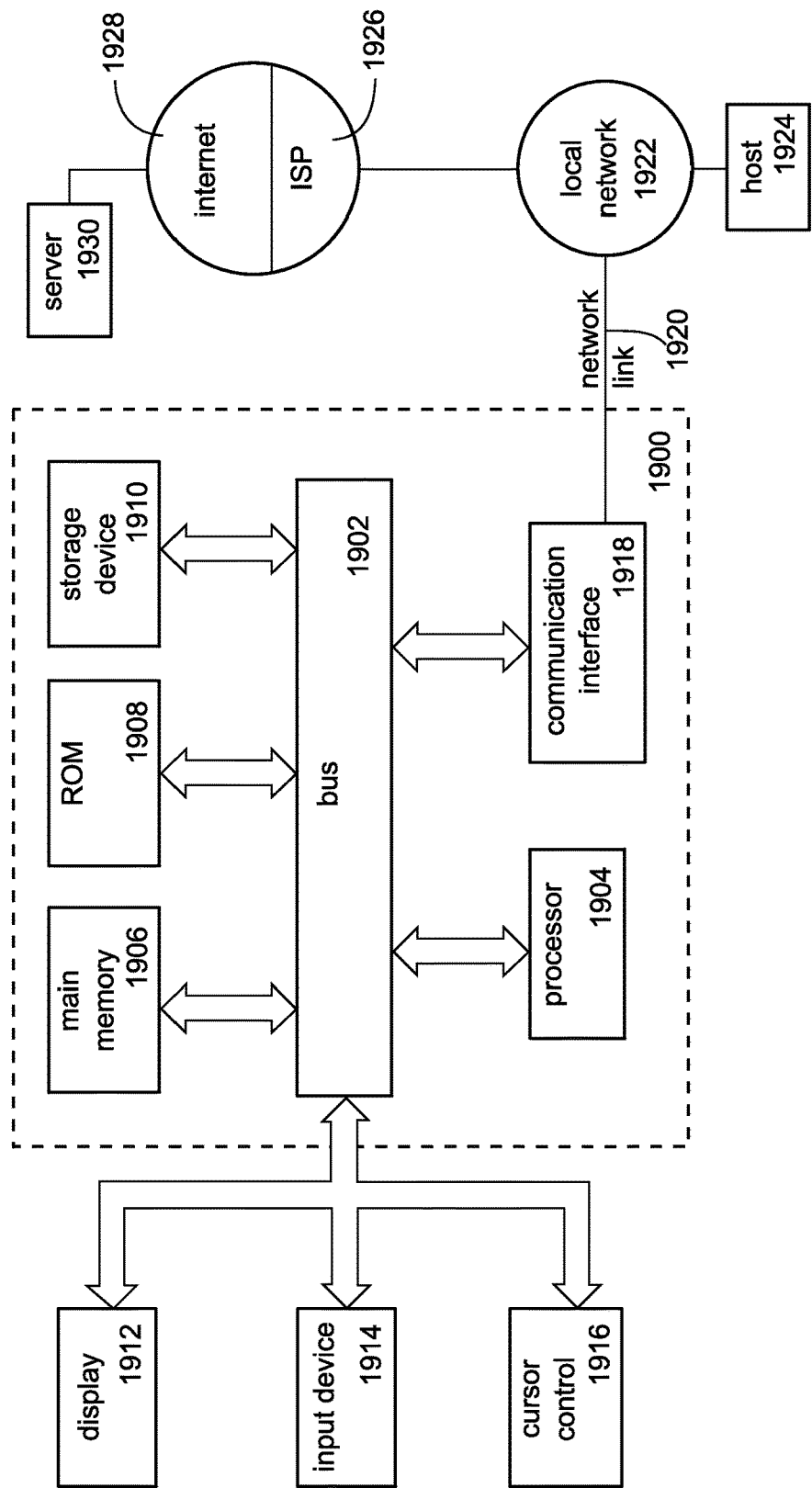
FIG. 19 is a block diagram that illustrates a computer system upon which aspects of this disclosure may be implemented.

FIG. 19 is a block diagram that illustrates a computer system 1900 upon which aspects of this disclosure may be implemented, such as, but not limited to client devices 110a-110n, developer devices 120a-120m, web server 130, change/bug tracker 140, email server 150, and "under-n" database 160. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT) or liquid crystal display (LCD), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane. Another type of user input device is a touchscreen, which generally combines display 1912 with hardware that registers touches upon display 1912.

This disclosure is related to the use of computer systems such as computer system 1900 for implementing the techniques described herein. In some examples, those techniques are performed by computer system 1900 in response to processor 1904 executing one or more sequences of one or more instructions contained in main memory 1906. Such instructions may be read into main memory 1906 from another machine-readable medium, such as storage device 1910. Execution of the sequences of instructions contained in main memory 1906 causes processor 1904 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 1900, various machine-readable media are involved, for example, in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution. In this manner, computer system 1900 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:

transmitting first data to a client device causing the client device to display a webpage, the webpage including a first panel and a first action access icon displayed within or adjacent to the first panel;

transmitting second data to the client device causing, in response to a selection of the first action access icon, the client device to display a plurality of action icons within or adjacent to the first panel;

receiving, from the client device, a first indication that one of the plurality of action icons within or adjacent to the first panel was selected;

obtaining a first context identifier associated with the first panel based on the first indication;

obtaining a first user interface from a plurality of user interfaces, based on which one of the plurality of action icons the first indication indicates was selected, wherein the first user interface is configured to allow submitting a first developer work item for the first context identifier, and the first user interface is further configured to allow reviewing developer work items previously submitted in association with the first context identifier;

in response to the first indication, transmitting third data to the client device causing the client device to display the first user interface;

receiving, via the first user interface on the client device, the first developer work item;

storing the first developer work item in association with the first context identifier;

retrieving first information about a second developer work item previously submitted in association with the first context identifier; and transmitting fourth data to the client device causing the client device to display the first information in the first user interface.

2. The method of claim 1, wherein:

the first user interface is configured to allow submitting a vote indicating interest in the second developer work item being completed; and the method further comprises:

receiving, via the first user interface on the client device, the vote; and in response to receiving the vote, storing a total number of votes received for the second developer work item.

3. The method of claim 1, wherein:

the first information includes a completion status for the second developer work item; and the fourth data causes the client device to display the completion status in the first user interface.

4. The method of claim 1, wherein:

the first indication indicates that a first action icon included in the plurality of action icons was selected, the first action icon being associated with submitting an idea or suggestion for improving a panel;

the obtaining the first user interface from the plurality of user interfaces is based on the first action icon being associated with the first user interface;
the first user interface is configured to collect details for an idea or suggestion for improving the first panel; and
the receiving the first developer work item includes receiving the details collected via the first user interface.

5. The method of claim 1, wherein:
the first indication indicates that a first action icon included in the plurality of action icons was selected, the first action icon being associated with submitting a bug report for a panel;
the obtaining the first user interface from the plurality of user interfaces is based on the first action icon being associated with the first user interface;
the first user interface is configured to collect details for a bug report for the first panel; and
the receiving the first developer work item includes receiving the details collected via the first user interface.

6. The method of claim 1, wherein:
the first indication indicates that a first action icon included in the plurality of action icons was selected, the first action icon being associated with submitting a change that is to be made to the first panel within a specified period of time;
the obtaining the first user interface from the plurality of user interfaces is based on the first action icon being associated with the first user interface;
the first user interface is configured to collect details for a change to be made to the first panel within a specified period of time; and
the receiving the first developer work item includes receiving the details collected via the first user interface.

7. The method of claim 1, wherein
the plurality of action icons includes a first action icon, a second action icon, and a third action icon; and
the plurality of user interfaces includes:
   a second user interface, associated with the first action icon, configured to collect details for an idea or suggestion for improving the first panel;
   a third user interface, associated with the second action icon, configured to collect details for a bug for the first panel; and
   a fourth user interface, associated with the third action icon, configured to collect details for change to be made to the first panel within a specified period of time.

8. The method of claim 1, wherein:
the third data further causes the client device to capture a screenshot image of the first panel in response to a selection of a screenshot capture element of the first user interface; and
the receiving the first developer work item includes receiving the screenshot image or an image based on the captured screenshot image.

9. The method of claim 1, wherein:
the first data further causes the client device to further include in the webpage a second panel and to display a second action access icon within or adjacent to the second panel;
the second data further causes, in response to a selection of the second action access icon, the client device to display the plurality of action icons within or adjacent to the second panel;

wherein the method further comprises:
   receiving, from the client device, a second indication that one of the plurality of action icons adjacent to the second panel was selected;
   obtaining a second context identifier associated with the second panel based on the second indication;
   obtaining a second user interface from the plurality of user interfaces, based on which one of the plurality of action icons the second indication indicates was selected, wherein the second user interface is configured to allow submitting a second developer work item for the second context;
   in response to the second indication, transmitting fourth data to the client device causing the client device to display the second user interface;
   receiving, via the second user interface on the client device, the second developer work item; and
   storing the second developer work item in association with the second context identifier.

10. The method of claim 1, further comprising:
identifying a first developer from a plurality of developers, based on the first context identifier; and
notifying the first developer that the first developer work item was received.

11. A system comprising:
one or more processors each configured to execute instructions; and
one or more nontransitory storage mediums configured to provide stored instructions to the one or more processors causing the one or more processors to:
   transmit first data to a client device causing the client device to display a webpage, the webpage including a first panel and a first action access icon displayed within or adjacent to the first panel;
   transmit second data to the client device causing, in response to a selection of the first action access icon, the client device to display a plurality of action icons within or adjacent to the first panel;
   receive, from the client device, a first indication that one of the plurality of action icons adjacent to the first panel was selected;
   obtain a first context identifier associated with the first panel based on the first indication;
   obtain a first user interface from a plurality of user interfaces, based on which one of the plurality of action icons the first indication indicates was selected, wherein the first user interface is configured to allow submitting a first developer work item for the first context identifier, and the first user interface is further configured to allow reviewing developer work items previously submitted in association with the first context identifier;
   in response to the first indication, transmit third data to the client device causing the client device to display the first user interface;
   receive, via the first user interface on the client device, the first developer work item;
   store the first developer work item in association with the first context identifier;
   retrieve first information about a second developer work item previously submitted in association with the first context identifier; and
   transmit fourth data to the client device causing the client device to display the first information in the first user interface.

12. The system of claim 11, wherein:
the plurality of action icons includes a first action icon, a second action icon, and a third action icon;
the plurality of user interfaces includes:
- a second user interface configured to collect details for an idea or suggestion for improving the first panel;
- a third user interface configured to collect details for a bug for the first panel; and
- a fourth user interface configured to collect details for change to be made to the first panel within a specified period of time; and the instructions further cause the one or more processors to:
- obtain the second user interface as the first user interface, in response to the first indication indicating that the first action icon was selected;
- obtain the third user interface as the first user interface, in response to the first indication indicating that the second action icon was selected; and
- obtain the fourth user interface as the first user interface, in response to the first indication indicating that the third action icon was selected.

13. The system of claim 11, wherein the instructions further cause the one or more processors to:
- identify a first developer from a plurality of developers, based on the first context identifier; and
- notify the first developer that the first developer work item was received.

14. The system of claim 11, wherein:
the third data further causes the client device to capture a screenshot image of the first panel in response to a selection of a screenshot capture element of the first user interface; and
the receiving the first developer work item includes receiving the screenshot image or an image based on the captured screenshot image.

15. A nontransitory computer readable storage medium comprising a plurality of instructions which when executed by one or more processors, cause the one or more processors to:
- transmit first data to a client device causing the client device to display a webpage, the webpage including a first panel and a first action access icon displayed within or adjacent to the first panel;
- transmit second data to the client device causing, in response to a selection of the first action access icon, the client device to display a plurality of action icons within or adjacent to the first panel;
- receive, from the client device, a first indication that one of the plurality of action icons adjacent to the first panel was selected;
- obtain a first context identifier associated with the first panel based on the first indication;
- obtain a first user interface from a plurality of user interfaces, based on which one of the plurality of action icons the first indication indicates was selected, wherein the first user interface is configured to allow submitting a first developer work item for the first context identifier, and the first user interface is further configured to allow reviewing developer work items previously submitted in association with the first context identifier;
- in response to the first indication, transmit third data to the client device causing the client device to display the first user interface;
- receive, via the first user interface on the client device, the first developer work item;
- store the first developer work item in association with the first context identifier;
- retrieve first information about a second developer work item previously submitted in association with the first context identifier; and
- transmit fourth data to the client device causing the client device to display the first information in the first user interface.

16. The nontransitory computer readable storage medium of claim 15, wherein:
the plurality of action icons includes a first action icon, a second action icon, and a third action icon;
the plurality of user interfaces includes:
- a second user interface configured to collect details for an idea or suggestion for improving the first panel;
- a third user interface configured to collect details for a bug for the first panel; and
- a fourth user interface configured to collect details for change to be made to the first panel within a specified period of time; and the instructions further cause the one or more processors to:
- obtain the second user interface as the first user interface, in response to the first indication indicating that the first action icon was selected;
- obtain the third user interface as the first user interface, in response to the first indication indicating that the second action icon was selected; and
- obtain the fourth user interface as the first user interface, in response to the first indication indicating that the third action icon was selected.

17. The nontransitory computer readable storage medium of claim 15, wherein the instructions further cause the one or more processors to:
- identify a first developer from a plurality of developers, based on the first context identifier; and
- notify the first developer that the first developer work item was received.

* * * * *